(12) United States Patent
Rapenne et al.

(10) Patent No.: US 12,291,004 B2
(45) Date of Patent: May 6, 2025

(54) LAMINATED GLAZING FOR A MOTOR VEHICLE, PARTICULARLY A SIDE GLAZING

(71) Applicant: SAINT-GOBAIN GLASS FRANCE, Courbevoie (FR)

(72) Inventors: Thibault Rapenne, Noyon (FR); Laurent Lamoureux, Ribecourt-Dreslincourt (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 218 days.

(21) Appl. No.: 17/913,369

(22) PCT Filed: Mar. 30, 2021

(86) PCT No.: PCT/FR2021/050553
§ 371 (c)(1),
(2) Date: Sep. 21, 2022

(87) PCT Pub. No.: WO2021/198608
PCT Pub. Date: Oct. 7, 2021

(65) Prior Publication Data
US 2023/0130593 A1 Apr. 27, 2023

(30) Foreign Application Priority Data
Apr. 1, 2020 (FR) ...................................... 2003232

(51) Int. Cl.
*B32B 17/10* (2006.01)
*B32B 3/08* (2006.01)
(Continued)

(52) U.S. Cl.
CPC .......... *B32B 17/10293* (2013.01); *B32B 3/08* (2013.01); *B32B 7/12* (2013.01);
(Continued)

(58) Field of Classification Search
CPC ......... B60J 1/001; B60J 1/006; E06B 3/6675; E06B 3/667; E06B 3/66; E06B 3/6617;
(Continued)

(56) References Cited

U.S. PATENT DOCUMENTS

| 7,273,532 B2 * | 9/2007 | Eckelt ............... B32B 17/10293 411/908 |
| 2014/0234576 A1 * | 8/2014 | Berard ..................... B60J 1/001 296/216.01 |

(Continued)

FOREIGN PATENT DOCUMENTS

| CN | 104476855 A | 4/2015 |
| FR | 2 732 730 A1 | 10/1996 |

(Continued)

OTHER PUBLICATIONS

International Search Report as issued in International Patent Application No. PCT/FR2021/050553, dated Jul. 2, 2021.

*Primary Examiner* — Alicia J Weydemeyer
(74) *Attorney, Agent, or Firm* — Pillsbury Winthrop Shaw Pittman LLP

(57) ABSTRACT

A laminated glazing for a motor vehicle includes inner and outer glass sheets assembled by an interlayer, and a part for attaching the glazing through which an attachment opening passes which is formed by two holes having first and second axis. A connecting member is attached to the glazing by passing through an opening, the connecting member provided with a hole being intended to receive a device for attaching the glazing with a drive device. The first axis and the second axis are mismatched according to a mismatch which is configured to form a first blocking surface on an inner face of the outer glass sheet and a second blocking surface on an outer face of the inner glass sheet, and the connecting member includes a first surface configured to (Continued)

engage with the first blocking surface and a second surface configured to engage with the second blocking surface.

20 Claims, 13 Drawing Sheets

(51) Int. Cl.
*B32B 7/12* (2006.01)
*B32B 27/08* (2006.01)
*B32B 27/30* (2006.01)
*B32B 27/34* (2006.01)
*B60J 5/04* (2006.01)

(52) U.S. Cl.
CPC ........ *B32B 17/10036* (2013.01); *B32B 27/08* (2013.01); *B32B 27/304* (2013.01); *B32B 27/34* (2013.01); *B60J 5/04* (2013.01); *B32B 2250/40* (2013.01); *B32B 2274/00* (2013.01); *B32B 2307/536* (2013.01); *B32B 2605/08* (2013.01)

(58) Field of Classification Search
CPC ............. E06B 3/5436; B32B 17/10036; B32B 17/10293
See application file for complete search history.

(56) References Cited

U.S. PATENT DOCUMENTS

2018/0178482 A1* 6/2018 Uebelacker ................ B60J 1/17
2019/0322161 A1 10/2019 Uebelacker et al.

FOREIGN PATENT DOCUMENTS

GB           2338003 A * 12/1999 ............. E04B 2/885
WO    WO 2019/068448 A1    4/2019

* cited by examiner

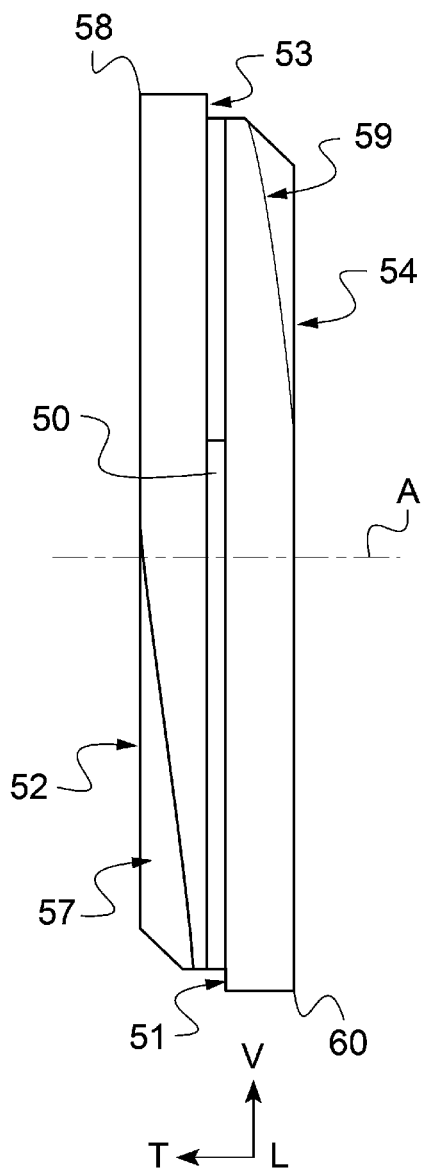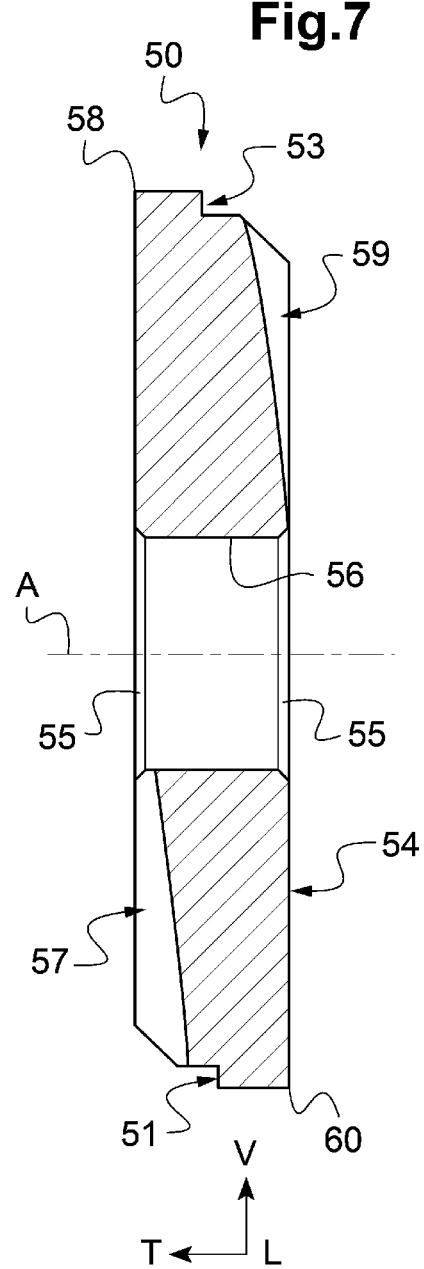

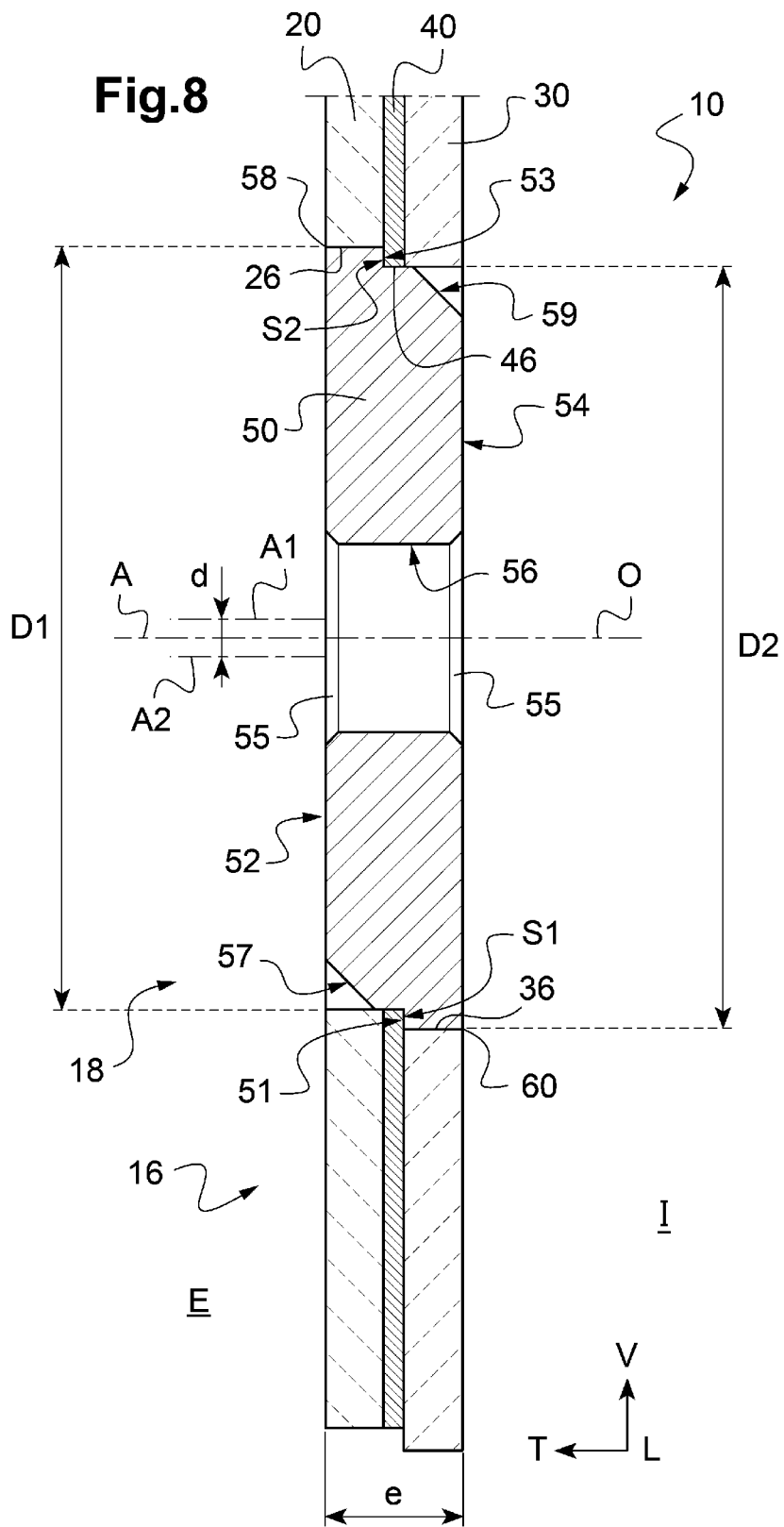

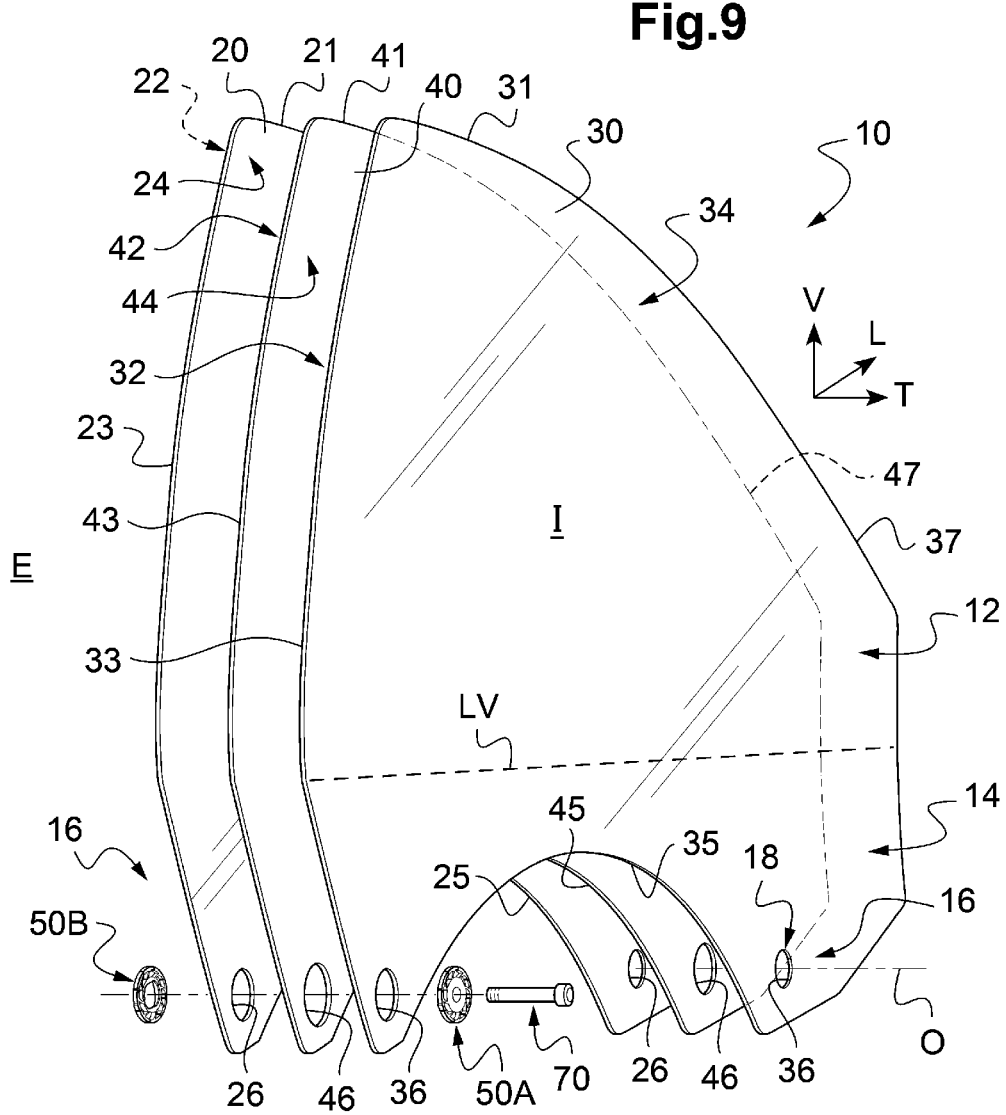

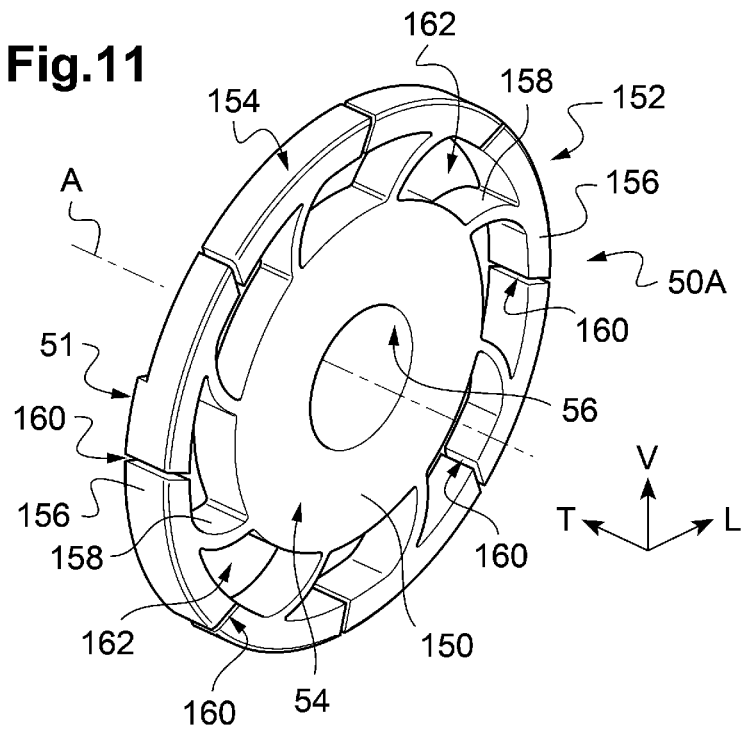
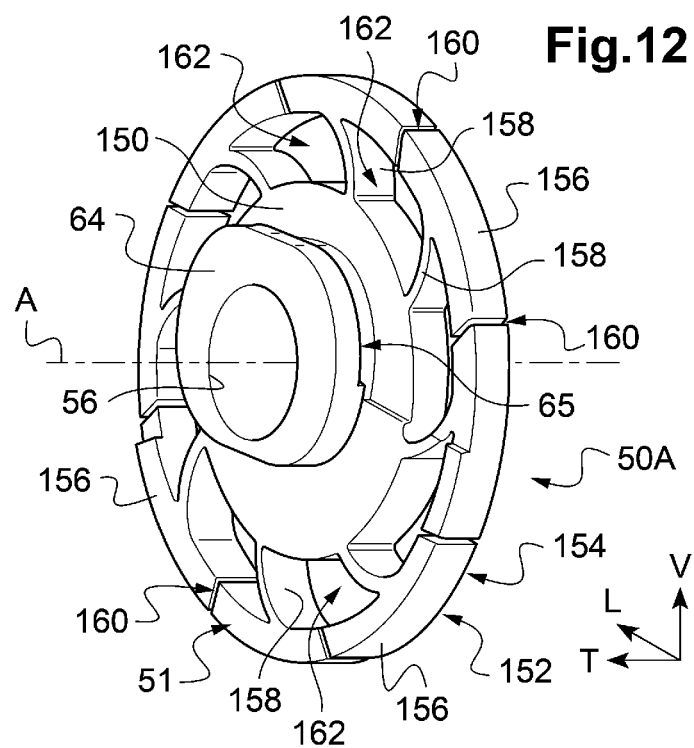

LAMINATED GLAZING FOR A MOTOR VEHICLE, PARTICULARLY A SIDE GLAZING

CROSS-REFERENCE TO RELATED APPLICATIONS

This application is the U.S. National Stage of PCT/FR2021/050553, filed Mar. 30, 2021, which in turn claims priority to French patent application number 2003232 filed Apr. 1, 2020. The content of these applications are incorporated herein by reference in their entireties.

TECHNICAL FIELD OF THE INVENTION

The invention relates to a laminated glazing for a motor vehicle, particularly a side glazing.

The invention relates more particularly to a laminated glazing for a motor vehicle, particularly a side glazing intended to be slidably mounted in a door of the vehicle, comprising at least one outer glass sheet and one inner glass sheet assembled by an interlayer which comprises at least one sheet of polymer material, said glazing comprising at least one part for attaching the glazing unit through which at least one attachment opening passes, which is formed by at least one hole having a first axis which is provided in the outer glass sheet, a hole provided in the interlayer and a hole having a second axis which is provided in the inner glass sheet, wherein at least one connecting member is attached to the glazing by passing through said attachment opening, said connecting member provided with a hole being intended to receive attachment means for attaching said glazing with a drive device.

The invention will be described more particularly for use in the automotive industry as a side glazing intended for being slidably mounted in the bodywork of a motor vehicle, in particular in a door of the vehicle, but is not however limited to such a use.

TECHNICAL BACKGROUND

Motor vehicle glazings are subject to increasingly stringent performance requirements that are often difficult to reconcile, such is particularly the case of side glazings.

In a motor vehicle, the side glazings are generally slidably mounted by means of a drive device inside the doors of the vehicle.

Such a side glazing comprises a visible zone and a non-visible zone which extend on either side of a limit of visibility, said non-visible zone located beneath the limit of visibility comprising at least one part for attaching the glazing which is intended to be connected by attachment means to a drive device.

Furthermore, in some vehicles and particularly for aesthetic reasons, the doors do not comprise a frame around the side glazing, as is the case with some convertibles, which contributes to increasing the performance demands on the glazing.

The English term "frameless" is used to refer to such doors in the motor vehicle industry.

In a known manner, the drive device of the side glazing is controlled selectively by means of a member, such as a crank or an electric button, to move the glazing heightwise with respect to the door, respectively between a closed position and at least one open position.

The side glazings of a vehicle are usually made up of more or less thick monolithic glass sheets. Such monolithic glazings are for example heated to a temperature of the order of 650° C. then rapidly cooled in order to temper them, generally while giving them a toric shape.

Monolithic glazings (also referred to as "tempered glazings") have the double advantage of being more resistant to mechanical stress and of fragmenting into a multitude of small pieces in the event of breaking. Such a fragmentation of the glazing, commonly referred to as "Securit fragmentation", additionally makes it possible to comply with the very precise specifications of international standard R43.

Compared to such a monolithic glazing, a laminated glazing comprises an outer glass sheet and an inner glass sheet which are assembled by an interlayer comprising at least one sheet of polymer material, such as at least one sheet of polyvinyl butyral (PVB).

Motor vehicle manufacturers seek, particularly for the most sophisticated vehicles, side glazings offering the best existing properties such as in particular qualities of sound attenuation, break-in resistance, athermal properties, etc.

This is one of the reasons why it is increasingly sought to use laminated glazings as side glazings in a motor vehicle.

Indeed, laminated glazings make it possible to improve acoustic comfort due to the absorption properties of the interlayer comprising at least one sheet of polymer material, such as polyvinyl butyral (PVB).

Laminated glazings also offer better break-in resistance as well as new properties such as blocking the UV radiation coming from the sun.

However, the use of such laminated glazings is not exempt from certain problems, particularly as regards mechanical strength when they are to be attached like monolithic glazings.

The attachment of the glazing is particularly important when interchangeability between the two types of glazing of a given thickness is sought, in order to be able to substitute them.

One of the problems encountered is being able to obtain a laminated glazing having characteristics, in particular of mechanical behavior, that are equivalent to those of a monolithic glazing.

In fact, the glass sheets that make up the laminated glazing do not reach the same stress levels as monolithic glazings, particularly because of their reduced thickness which does not allow a sufficient thermal gradient to be created during cooling to generate the stresses necessary for obtaining Securit fragmentation.

This is the reason why such laminated glazings are also referred to as "hardened" or "semi-tempered" as opposed to the "tempered" designation commonly used for monolithic glazings.

The use of a laminated glazing as side glazing does not pose a safety problem in itself since the sheet of polymer material of the interlayer ensures the cohesion of the assembly in the case of an accident and thus avoids the projection of pieces of glass capable of causing injuries.

However, in addition to their characteristics of mechanical behavior, laminated glazings generally differ from monolithic glazings in terms of how they are connected to the drive device.

To provide the connection of a side glazing with the drive device housed in the door, different types of links are known from the background art.

A first type of connection by bonding is known wherein the attachment means comprise for example at least one connecting part or a pair of connecting parts which are attached by bonding to the glazing in order to movably connect the glazing to the drive device.

According to one exemplary embodiment of attachment means used for this first type of connection, the attachment means comprise at least one Y-shaped connecting part (referred to as "holder") which, on the one hand, is attached to said glazing by bonding and, on the other hand, is connected to the drive device, generally by screwing or another equivalent means.

The Y-shaped connecting part comprises for example two flanges which are each attached by bonding to one of the internal and external faces of the glazing, respectively.

The Y-shaped connecting part is arranged in the vicinity of the lower edge located below the limit of visibility, that is in the non-visible zone concealed in the door, in order to movably connect the side glazing to the drive device.

This first type of connection by bonding still needs the implementation of at least one specific bonding step, following the assembly of the laminated glazing.

A second type of connection is also known wherein the attachment means are connected to the glazing by pinching a part of the glazing, only by the outside.

The attachment means for such a second type of connection are for example similar to those described previously in that they comprise particularly at least two parts which are arranged on either side of a glazing located in the non-visible zone.

The two parts that provide the pinching are for example assembled with one another below the glazing, generally by screwing. Thus, the parts are clamped together at one of their ends and such as to, at their other end, pinch the external and internal faces of the glazing with a clamping force capable of guaranteeing the movable connection between the glazing and the drive device.

If, compared to the first type of connection, this second type of connection makes it possible to eliminate the bonding step, the associated attachment means sometimes have a size that is considered to be large, particularly vertically, which contributes to limiting their use.

It is noted however that the first type and the second type of connection have in common that they do not require one or more attachment holes to be provided in the glazing as is the case with the attachment means of the third type of connection that is described hereunder.

Furthermore, this (absence of holes) is one of the reasons why these first and second types of connection are used in the vast majority of cases for laminated glazings.

Indeed and by comparison, the third type of connection is additionally characterized in that one or more attachment holes are provided in the glazing and are intended for receiving a part of the attachment means associated with the glazing.

The attachment means for this third type of connection comprise for example parts arranged on either side so as to clamp the glazing by the outside (as in the second type).

According to a feature specific to this third type of connection, the parts of the attachment means are connected to one another through the attachment hole which is provided in the glazing, generally connected by screwing or any other equivalent means.

Such attachment means comprise for example an axis that passes through the attachment hole provided in the glazing.

Due to the one or more attachment holes that the glazing must comprise, this third type of connection is, on the contrary, that which is commonly used for monolithic glazings.

The one or more attachment holes are indeed advantageously made in the monolithic glazing before tempering so that no step is needed after forming the glazing in order to provide its attachment to the drive device.

Moreover and compared to the first and second type of connection, the fact that the attachment means pass through the glazing is also advantageous in terms of safety, in particular because it guarantees that the glazing remains connected to the drive device in the event of a crash or crashes.

Thus, the choice of the first type of connection and of the second type of connection in the case of laminated glazings and of the third type of connection in the case of monolithic glazings is particularly the result of characteristics specific to each of the glazings.

Nevertheless, the choice of attachment means of a given type of connection depending on the type of glazing is no longer the only factor to be taken into account, other factors have led to the evolution of what has just been presented.

A standardization of the drive device is in particular increasingly sought after nowadays by motor vehicle manufacturers in order to be able to mount a monolithic type or laminated type side glazing indifferently in the door of a vehicle, particularly of the same model, that is to have glazings that are interchangeable.

This is one of the reasons why it has been sought to apply to laminated-type side glazings the third type of connection, commonly used with monolithic-type side glazings, and requiring at least one attachment hole in the glazing.

In the case of this third type of connection, the glazing comprises at least one perforated attachment part, sometimes two separate attachment parts according to the glazing, which are made in the non-visible zone located below the limit of visibility.

As indicated previously, the one or more attachment parts therefore comprise at least one attachment hole provided through the glazing. The attachment hole opening onto the two faces of the glazing is intended to receive attachment means, said attachment means applying clamping forces onto the attachment part and being connected to the drive device.

The laminated glazing according to the present invention is intended for use with such a connection of the third type and thus comprises at least one attachment part comprising one or more attachment holes configured to receive means for attachment with the drive device of the glazing.

Compared to a connection of the first type, such a connection of the third type with a perforated glazing makes it possible particularly to eliminate any bonding operation between the glazing and the attachment means.

Compared to a connection of the second type, such a connection of the third type additionally makes it possible to save space.

However, the implementation of the third type of connection with attachment hole with a laminated glazing poses problems linked to the characteristics of mechanical behavior of a laminated glazing, which problems furthermore explain the fact that the first or second type of connection is still the attachment solution that is used in the vast majority of cases with such laminated glazings.

Firstly, the glass sheets of a laminated glazing intended for a motor vehicle have a low thickness, generally at least one of the glass sheets has a thickness less than 2.6 mm, the glass sheets optionally having the same thickness. This is the reason why it is not possible to apply to same a tempering operation equivalent to that implemented for a monolithic glazing.

The consequence recited previously in connection with the mechanical behavior is that a laminated glazing has lesser characteristics than those of a monolithic glazing, especially in terms of stress and impact resistance.

And yet, such stresses and such impacts are applied to the one or more parts for attaching the glazing on the one hand by the attachment means themselves due to the clamping and, on the other hand, during use, for example when the door is slammed.

Another problem encountered with a laminated glazing provided with an attachment opening is the fact that the holes made in each of the glass sheets (before forming the laminated glazing) are then mismatched relative to one another once the operation to assemble the outer and inner glass sheets by means of the interlayer has been carried out.

Indeed, due to the different radii of curvature between the outer and inner faces of the laminated glazing, the first axis associated with the hole provided in the outer glass sheet is not coaxial with the second axis associated with the other hole provided in the inner glass sheet.

This mismatch (or misalignment) phenomenon between the axes of the holes provided in each of the glass sheets of the laminated glazing to obtain an attachment opening is sometimes referred to in French using the English term "mismatch".

This mismatch phenomenon additionally has the consequence of not allowing a good take-up, a good distribution, of the forces on each of the glass sheets of the laminated glazing. Thus, the characteristics of mechanical behavior obtained with a laminated glazing can pose problems due to the consequences of the mismatch phenomenon.

In order to solve these different problems of mismatch and mechanical behavior, solutions have thus been researched.

One of the solutions consists of using an insert which, inserted into the attachment opening, passes right through the glazing to which it is attached by bonding. Document CN104476855 shows in a non-limiting manner an exemplary embodiment of such an insert.

Another solution consists of a specific design of the laminated glazing which, referred to as "asymmetric", is characterized by the fact that at least the inner glass sheet, which is shorter, does not cover the one or more other sheets of the glazing at the attachment part.

Thus, an asymmetric glazing comprises an inner glass sheet through which the attachment means for attaching the glazing with the drive device do not pass, said inner glass sheet not comprising a hole for the attachment means, by virtue of which there is no longer a problem of mismatch.

The inner glass sheet of such an asymmetric glazing is therefore connected to the drive device only by means of the other sheets of the glazing, that is indirectly via the interlayer due to the assembly of the sheets that make up the laminated glazing.

In mechanical terms, an asymmetric laminated glazing is thus attached to the drive device essentially by the outer glass sheet, which thus is generally thicker.

The solutions of the background art presented previously reveal various drawbacks which the present invention aims in particular to resolve.

Firstly, many of these solutions require at least one bonding operation to be carried out after the laminated glazing has been manufactured, thus impacting on the manufacturing process and involving additional costs.

Secondly, the above-mentioned solutions imply a variation in the thickness of the part for attaching the laminated glazing. In fact, either an overthickness is created due to the use of connection parts attached by bonding, or conversely an underthickness is created in the case of an asymmetric glazing.

Thus, the known solutions do not make it possible to offer motor vehicle manufacturers the desired interchangeability between monolithic glazing and laminated glazing as side glazing, which by allowing a standardization of the attachment means for attachment with the drive device, or even of the sealing means associated with the glazing, is an important lever for cost reduction.

Finally, problems were mostly observed with the durability of the laminated glazing, with creep of the polymer material of the interlayer occurring particularly as a result of the clamping forces applied to the attachment part by the attachment means.

And yet, such a creep of the polymer material of the interlayer has the consequence of modifying the bearing surfaces by which the attachment means bear on the glazing. Thus, this creep is likely to lead to a relaxation that can cause an unexpected breakage at the attachment part or result in a lack of rigidity of the glazing due to the reduction of the clamping forces, problems which are even more detrimental in the case of a glazing equipping a frameless door.

Furthermore, given the forces involved, the glass is also capable of breaking initially when the attachment means are tightened, particularly by screwing, due to the concentration of stress. Thus, the attachment of the laminated glazing remains an operation that is often delicate to perform.

The design freedom of the laminated glazing and more particularly its thickness is limited since it is accepted that a glass sheet thickness of at least 1.6 mm is required to prevent such a breakage.

Thus, a laminated glazing generally has either a greater thickness than a monolithic glazing or the above-mentioned drawbacks.

The present invention aims in particular to solve the drawbacks of the background art, more particularly to propose a laminated glazing which, having improved characteristics in terms of mechanical behavior, is in particular able to be interchangeable with a monolithic glazing by virtue of at least one attachment opening comprising a connecting member able to engage with attachment means for attaching said glazing with a drive device.

SUMMARY OF THE INVENTION

To this end, the invention proposes a laminated glazing of the type described previously, characterized in that the first axis of the hole of the outer glass sheet and the second axis of the hole of the inner glass sheet are mismatched with respect to one another according to a mismatch that is configured to form a first blocking surface on an inner face of the outer glass sheet and a second blocking surface on an outer face of the inner glass sheet, and in that said at least one connecting member comprises a first surface configured to engage with said first blocking surface of the outer glass sheet and a second surface configured to engage with said second blocking surface of the inner glass sheet.

According to the invention, said first and second axes of the holes provided in the glass sheets of the glazing are intentionally mismatched, by a determined mismatch or offset, so as to create said blocking surfaces on each of the faces of said outer and inner glass sheets of the glazing, inner and outer faces which are respectively oriented towards the interlayer.

It is important to note that a person skilled in the art conversely seeks to minimize, or else to do away with, the mismatch phenomenon between the axes of the holes of a laminated glazing, so the invention goes against technical prejudices that would lead the person skilled in the art to seek as much coaxiality as possible between said axes.

In the background art, the laminated glazing thus does not comprise any functional surface at the attachment opening, i.e. one that is able in particular to block the connecting member as in the present invention.

Advantageously, the connecting member is configured to be blocked automatically when it is mounted in the attachment opening.

Advantageously, the connecting member is configured so that said first and second faces bear, directly or indirectly, against the diametrically opposed blocking surfaces by virtue of which said member is then blocked, immobilized, including when the sheets of the laminated glazing still have not been assembled.

Advantageously, the connecting member makes it possible to optimize the transmission of forces in the glazing, the generated forces being respectively transmitted to one and/or the other of the glass sheets via the blocking surface carried by each of said sheets.

For example in the case of vibration leading to an oscillation of the upper part of the glazing, the forces are advantageously transmitted alternatively to said outer and inner glass sheets. Indeed, the forces are then transmitted by the faces of the member bearing against said blocking faces and this happens even when a sheet of polymer material from the interlayer is positioned therebetween.

Advantageously, the connecting member of the glazing comprises at the center a hole with a given diameter through which attachment means are intended to pass. Thus, it is possible for a given mismatch value of the axes to standardize the connecting member as a piece, with only the diameter of the hole varying to adapt to the attachment means of each application.

The connecting member may not initially comprise a hole at the time of manufacture, or even when it is mounted in the attachment opening of the glazing, said hole only being produced by any appropriate means subsequently, particularly after mounting and the assembly of the sheets of the glazing, so as to increase the positioning precision of the hole and thus the quality of the attachment of the glazing.

Preferably, the hole provided in the connecting member is smooth, lacking a thread. The attachment means comprise for example at least two perforated plates and a pin passing through them as well as the connecting member at the hole, the pin comprising a head able to apply a clamping force on one of the plates and, at its free end opposite the head, a thread able to engage with a threaded hole provided in the other one of the plates, alternatively with a nut.

The plates are arranged on either side of the connecting member rigidly connected to the glazing and are then clamped by screwing the attachment means respectively against the outer and inner faces of the member so that said connecting member then provides a spacer function.

Advantageously, by thus forming a spacer, the connecting member also prevents the clamping forces exerted by the means for attachment by screwing from being applied directly onto the glass sheets of the glazing.

Advantageously, the connecting member can limit the creep of the polymer material at the attachment part of the glazing stressed by the attachment means by screwing.

Preferably, the connecting member is entirely housed inside the attachment opening, configured to be comprised in the thickness of the laminated glazing.

Advantageously, the connecting member thus has a particularly reduced size by comparison particularly with an insert according to the background art, such insert attached by bonding engaging generally with the outer face of the outer glass sheet and/or the inner face of the inner glass sheet.

Advantageously, said at least one connecting member is made of a thermoplastic material, preferably by injection, by virtue of which the different technical forms like the bearing faces are able to be obtained precisely and, especially, easily.

Advantageously, the connecting member is made of a material chosen to withstand the conditions of temperature and pressure that occur during the assembly of the laminated glazing by virtue of which said member is able to be mounted prior to said assembly so that no subsequent operation is required.

Advantageously, the first blocking surface carried by the outer glass sheet is oriented towards the inside and the second blocking surface carried by the inner glass sheet is oriented towards the outside of the glazing.

The first blocking surface is formed by a portion of the inner face of the outer glass sheet and said second blocking surface is formed by a portion of the outer face of the inner glass sheet.

Advantageously, said at least one sheet of polymer material forming the interlayer is configured to cover all or at least part of said blocking surfaces so that the polymer material constituting said sheet (for example polyvinyl butyral PVB) is positioned between the surfaces of the connecting member and said blocking surfaces.

Advantageously, said at least one sheet of polymer material forming the interlayer is configured so as not to cover said blocking surfaces, the hole provided in the interlayer having for example a diameter larger than the diameter of the hole of the outer glass sheet and of the hole of the inner glass sheet.

Advantageously, the connecting member is configured to be housed inside said attachment opening, in the thickness of the glazing, said connecting member comprising an outer face which is flush with respect to an outer face of the outer glass sheet and an inner face which is flush with respect to an inner face of the inner glass sheet.

Advantageously, the connecting member comprises an outer face and an inner face which are planar, said faces being overall coplanar, at the attachment part, with an outer face of the outer glass sheet forming the outer surface of the glazing and with an inner face of the inner glass sheet forming the inner surface of the glazing.

Advantageously, the connecting member is mounted in the attachment opening prior to the assembly of the outer glass sheet and of the inner glass sheet by the interlayer by virtue of which no operation after the assembly of the glazing is required, the attachment of said connecting member being obtained simultaneously with the assembly of said sheets constituting said laminated glazing.

Advantageously, the hole of the connecting member comprises at least one chamfer made at one and/or the other of said outer and inner faces.

Advantageously, the connecting member comprises at least one central part provided with the hole and a flexible peripheral part that is configured to be radially elastic, said flexible peripheral part comprising a discontinuous ring formed by pads which are each connected to the central part by at least one elastic arm able to deform radially, orthogonally to the axis.

Advantageously, the hole of the outer glass sheet comprises at least one chamfer made at one and/or the other of said faces of the sheet and/or the hole of the inner glass sheet comprises at least one chamfer made at one and/or the other of said faces of the sheet.

According to other characteristics of the invention:
the first blocking surface and the second blocking surface are respectively crescent-shaped;
the axis of the hole and the axis of the hole are vertically mismatched with respect to one another;
the first blocking surface and the second blocking surface are arranged diametrically opposite one another, said first and second blocking surfaces being arranged symmetrically with respect to an axis of the attachment opening of the glazing;
the connecting member is attached to the glazing by interlocking between said surfaces of the member and the blocking surfaces;
the connecting member is attached to the glazing by bonding via the polymer material of said at least one sheet of the interlayer;
the first surface and the second surface of the connecting member are arranged diametrically opposite one another, said surfaces being symmetrical with respect to an axis of the connecting member;
the connecting member is made of a thermoplastic material, for example polyamide (PA) such as PA 6-6, polyoxymethylene (POM), polybutylene terephthalate (PBT);
the connecting member is configured to form a spacer with respect to the laminated glazing, particularly able to limit when the glazing is assembled the creep of the polymer material of said at least one sheet of the interlayer;
the connecting member of the attachment means is produced as a single, integral piece;
the connecting member has an elliptical perimeter;
the connecting member comprises a first chamfer associated with the first surface and a second chamfer associated with the second surface which are intended to facilitate the mounting of said connecting member in the attachment opening;
the connecting member is produced as two pieces able to be rigidly connected to one another via complementary fastening means carried by each of said pieces;
said pieces forming the connecting member are attached together by interlocking, preferably by screwing, alternatively by elastic interlocking (or snap-fitting) or by interference fitting or by bonding;
the connecting member is configured to deform radially in an elastic manner in order to be able to be adjusted when said connecting member is inserted into the attachment opening.

BRIEF DESCRIPTION OF THE FIGURES

Further characteristics and advantages of the invention will become apparent upon reading the following detailed description, for the understanding of which reference is made to the appended drawings, wherein:

FIG. 6 is an end view which depicts the connecting member according to FIGS. 4 and 5 and which shows the first face and the second face of the connecting member which, symmetrical with respect to the main axis of the member, are diametrically opposite and oriented transversely towards the outside and towards the inside, respectively;

FIG. 7 is a cross-sectional view according to the plane VII-VII depicted in FIGS. 4 and 5 which depicts the connecting member and which shows said member comprising at the center a hole through which the attachment means are intended to pass;

FIG. 8 is a cross-sectional view according to the plane VIII-VIII depicted in FIGS. 1 and 2 which depicts the connecting member mounted in the attachment opening and which shows the first face of the member bearing against the first blocking surface and the second face bearing against the second blocking surface, respectively positioning therebetween the sheet of polymer material of the interlayer in order to bond said member;

FIG. 9 is a perspective view which, in an exploded view, depicts the laminated glazing comprising a connecting member according to a second embodiment and which shows, in an equivalent manner to FIG. 3 in the rear attachment part of the glazing, the attachment opening comprising a hole in the outer glass sheet and a hole in the inner glass sheet whose axes are mismatched by a determined mismatch in order to create the diametrically opposite blocking surfaces with which first and second complementary surfaces of said member engage;

FIG. 11 is a perspective view which depicts, viewed from the inside, the first piece of the connecting member according to the second embodiment and which shows a peripheral part of said first piece configured to be radially deformable and surrounding a central part comprising the opening for the passage of fastening means configured to obtain an attachment by quarter-turn screwing;

FIG. 12 is a perspective view which depicts, viewed from the outside, the first piece of the connecting member according to FIG. 11 and which shows the first bearing surface carried by the flexible peripheral part and fastening means carried by the central part which are intended to engage with complementary means carried by the second piece of the member in order to obtain said attachment by quarter-turn screwing between said first and second pieces forming the connecting member;

DETAILED DESCRIPTION OF THE INVENTION

In the following detailed description, the longitudinal, vertical and transverse orientations are used in a non-limiting manner in reference to the 3D coordinate system (L, V, T) depicted in the figures.

By convention, the description will use the terms "front" and "rear" in reference to the longitudinal orientation, the terms "upper" and "lower", or "top" and "bottom", in reference to the vertical orientation and the terms "outer" and "inner" or "external" and "internal" in reference to the transverse orientation of said 3D coordinate system (L, V, T).

In the rest of the description, the embodiments and/or alternatives of the invention will be advantageously described by comparison and, in the figures, elements that have equivalent functions or identical structures will be denoted by the same reference.

FIGS. 1 to 8 depict a laminated glazing 10 for a motor vehicle according to a first embodiment of the invention.

The laminated glazing 10 according to the invention will be described by way of non-limiting example in the context of a use as side glazing. Such a side glazing is intended to be slidably mounted, according to the vertical orientation, in a door (not shown) of the vehicle.

In such an application fora motor vehicle, the side glazing thus provides a separation between an outside space E which is outside the vehicle and an inside space I which is inside the vehicle.

Thus, the terms "outside" and "inside" are applied hereunder to the laminated glazing 10 in accordance with this notion of outside space E and inside space I.

Figure 1:
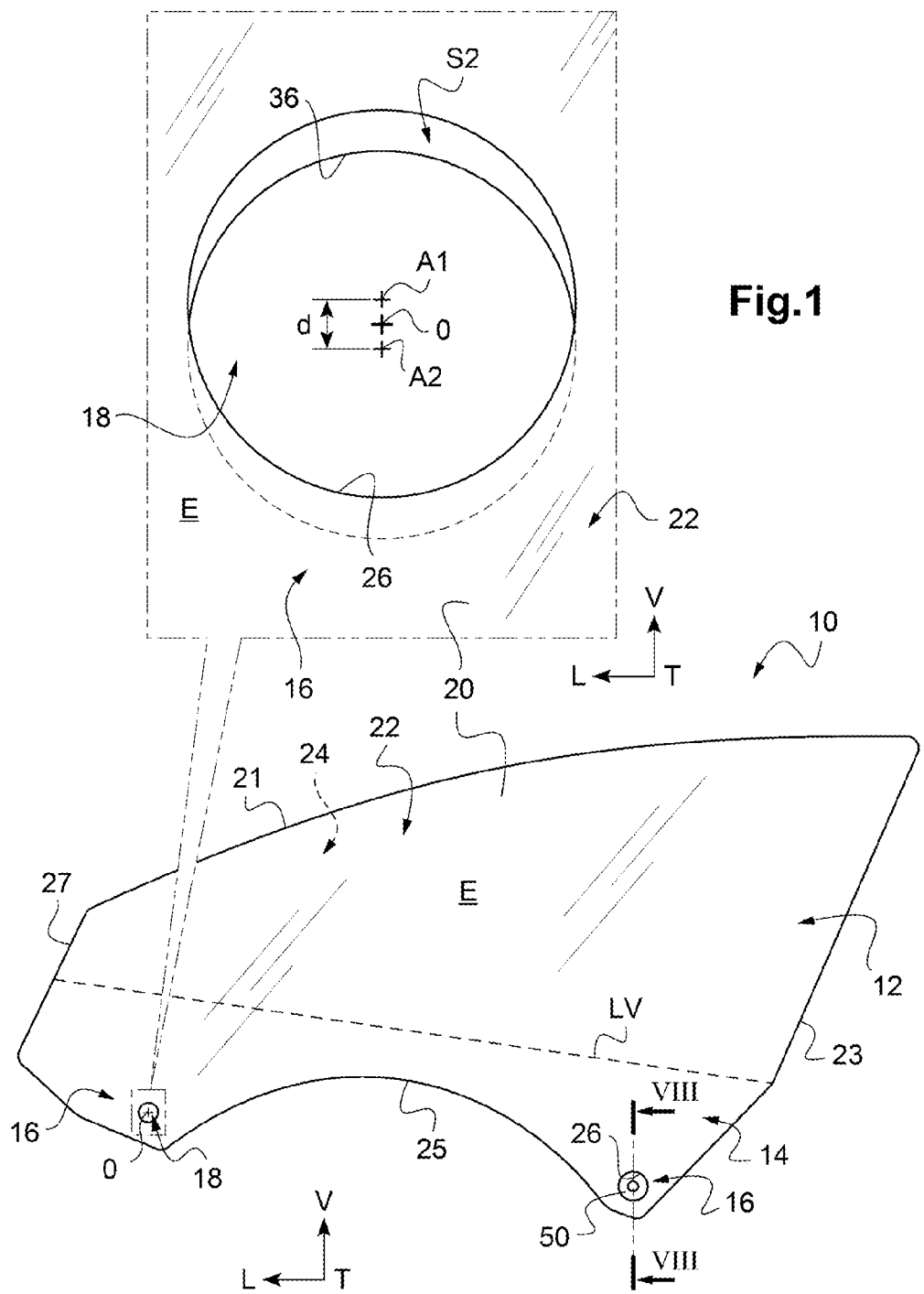
FIG. 1 is a side view which depicts, from the outside, a laminated glazing for a motor vehicle comprising a connecting member in a single piece according to a first embodiment and which shows the outer glass sheet of the laminated glazing comprising in its non-visible zone two front and rear attachment parts each provided with an attachment opening, one of which (rear) comprises a member for mounting the attachment means for attaching said glazing with a drive device and the other one of which (front) does not include a member in order to show by means of an enlarged view the second blocking surface which, carried by the inner glass sheet, is obtained by mismatching the axes of the holes that form said opening.
Figure 2:
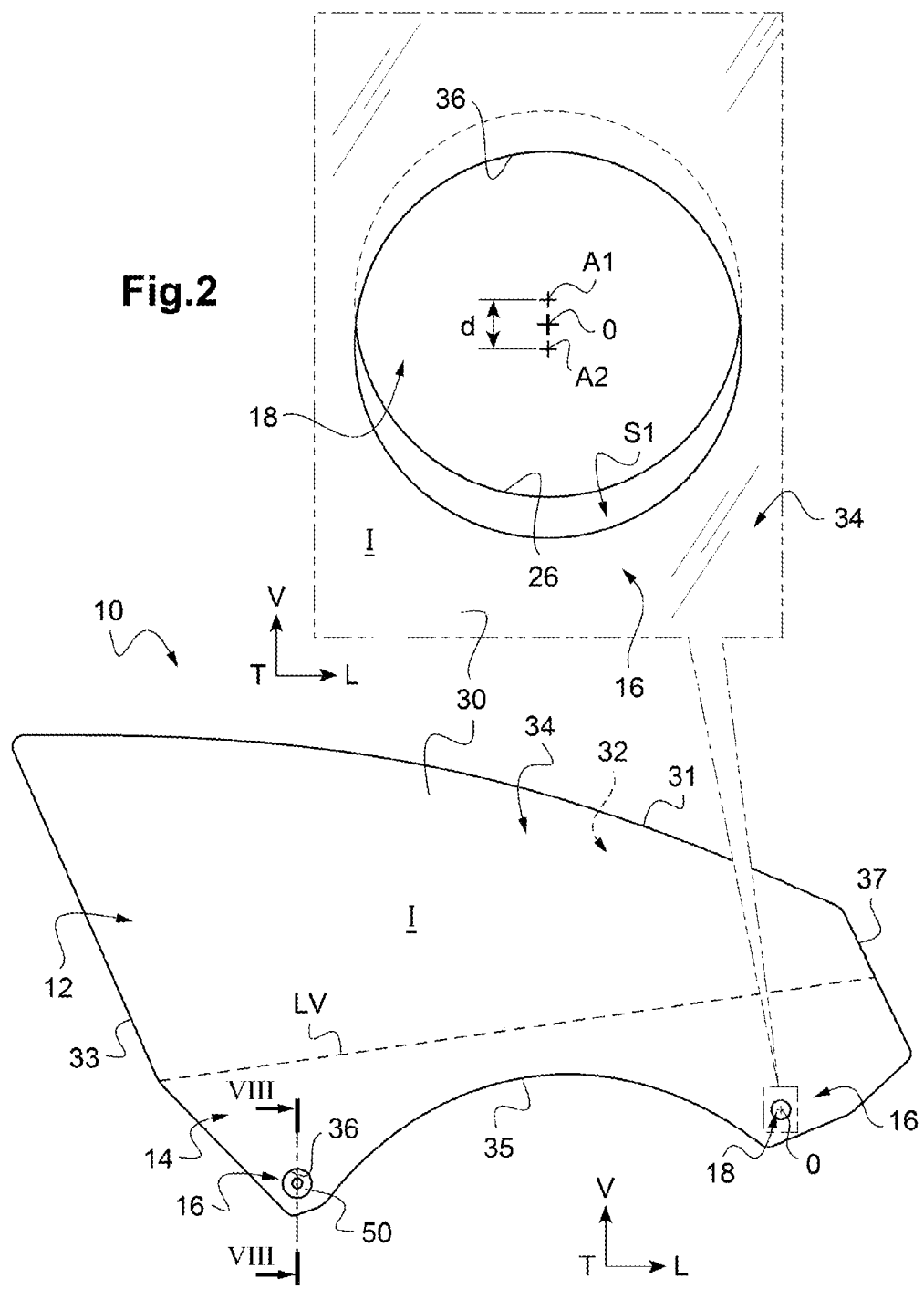
FIG. 2 is a side view which depicts, from the inside, the laminated glazing according to FIG. 1 and which additionally shows the attachment opening of the rear attachment part of the laminated glazing comprising said connecting member configured to be mounted in the opening and to have means for attachment by screwing passing through it, as well as an enlarged view of the attachment opening of the front attachment part not provided with said connecting member in order to show the first blocking surface carried by the outer glass sheet.
Figure 3:
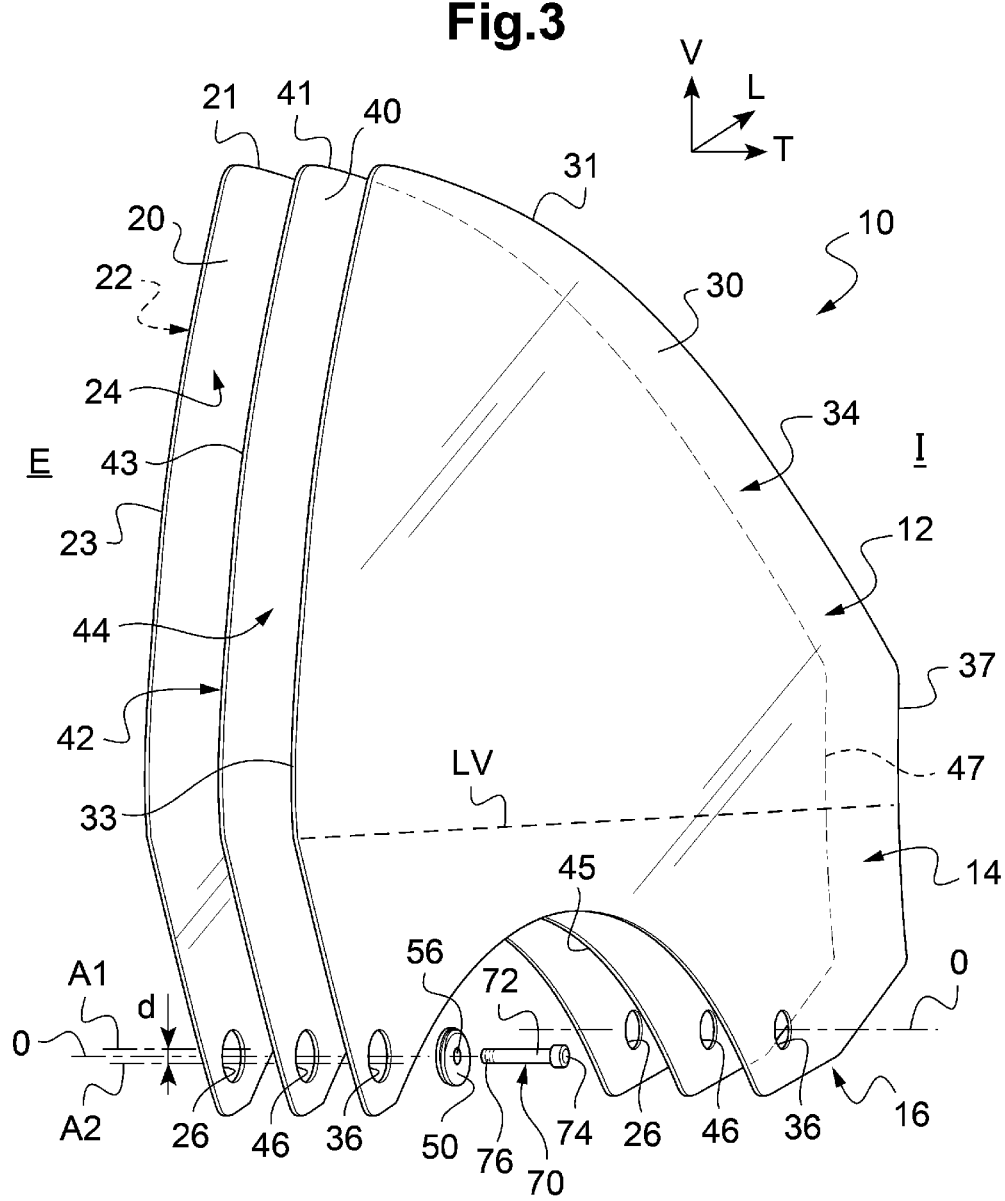
FIG. 3 is a perspective view which, in an exploded view, depicts the laminated glazing comprising a connecting member according to the first embodiment of FIGS. 1 and 2 and which shows, in the rear attachment part of the glazing, the attachment opening additionally formed by a hole in the outer glass sheet and a hole in the inner glass sheet whose axes are mismatched by a determined mismatch in order to create the diametrically opposed blocking surfaces with which first and second complementary surfaces of said connecting member engage.
Figure 4:
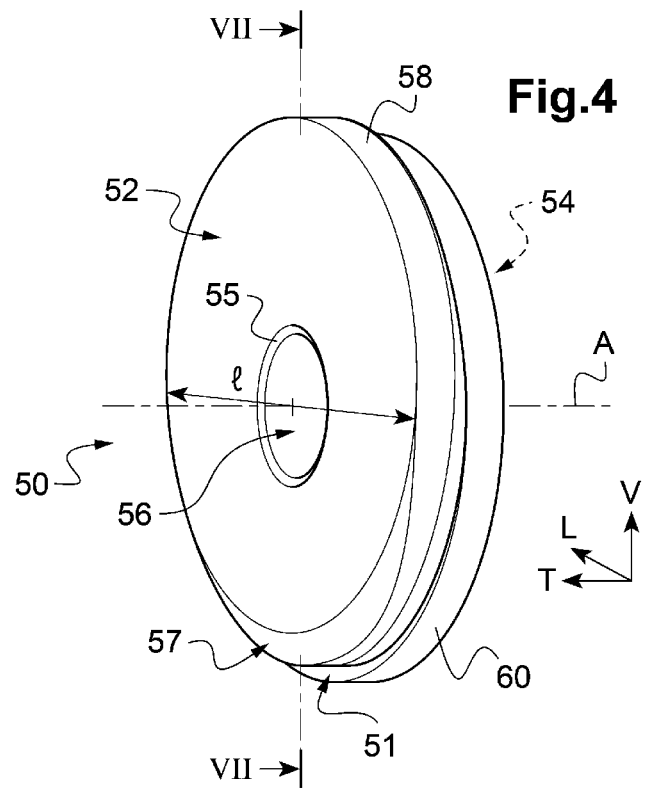
FIG. 4 is a perspective view which depicts, viewed from the outside, the connecting member according to the first embodiment and which shows the first bearing surface intended to engage, directly or by positioning therebetween said at least one sheet of polymer material of the interlayer, with the first blocking surface carried by the inner face of the outer glass sheet.

FIGS. 1 to 3 show more particularly said laminated glazing 10 consecutively in a side view from the outside, from the inside and then exploded.

The laminated glazing 10 comprises a so-called visible zone 12, and a so-called non-visible zone 14, which extend on either side of a limit of visibility LV of the glazing, the non-visible zone 14 corresponding to a lower part of the glazing permanently concealed inside the door.

In FIGS. 1 and 2 the limit of visibility LV has been depicted in dotted lines in order to materialize it. The limit of visibility LV generally corresponds to a wiper seal mounted integrally with the door, said seal being arranged to engage with the laminated glazing 10, in particular when said glazing 10 slides relative to the door.

The laminated glazing 10 comprises, in said non-visible zone 14 located below the limit of visibility LV, at least one attachment part 16 which comprises at least one attachment opening 18 intended to receive attachment means for attaching the glazing 10 with a drive device (not shown) of said glazing 10.

The laminated glazing 10 comprises at least one attachment opening 18 which has an axis O oriented transversely according to the 3D coordinate system (L, V, T).

The attachment means between the glazing 10 and the drive device are intended to pass through the part 16 for attaching the glazing 10 via said at least one attachment opening 18.

Preferably, the attachment means associated with the glazing 10 are means for attachment by screwing, i.e. able to perform a connection of the third type according to the background art presented previously, or alternatively any other equivalent means.

In a known manner, such attachment means are configured to be rigidly connected to the glazing 10, by a connection involving screwing, thus transversely applying clamping forces on each of the attachment parts 16.

The drive device (sometimes referred to as "window lift") is controlled selectively to move said glazing 10, according to a translation movement, heightwise between at least one high, so-called closed, position of the door window opening and a low, so-called open, position of all or part of said window opening.

The laminated glazing 10 herein comprises two attachment parts 16, a first attachment part 16 located towards the front and a second attachment part 16 located towards the rear, respectively.

The first and second attachment parts 16 are for example formed by excrescences, separated from one another according to the longitudinal orientation.

Preferably, each of said first and second attachment parts 16 comprises at least one attachment opening 18.

In a variant not shown, only one of said first and second attachment parts 16 comprises an attachment opening 18, preferably the one of the attachment parts 16 that is located at the rear of the glazing 10.

According to this variant, the other attachment part 16 located at the front of the glazing 10 thus does not comprise an attachment opening 18 but engages with the attachment means to produce a connection of the first or second type described previously.

Thus, a single laminated glazing 10 can comprise different attachment means, in other words, according to the example, a connection of the first or second type at the front and a connection of the third type at the rear the attachment means of which pass through an attachment opening 18 of the glazing 10.

In a variant not shown, the laminated glazing 10 comprises a single attachment part 16, said attachment part 16 comprising for example at least one attachment opening 18, preferably two attachment openings 18 separated from one another according to the longitudinal direction intended to receive attachment means for producing a connection of the third type as presented previously.

The number of parts 16 for attaching the glazing 10 is, like the shape of the latter, determined based on the application, i.e. on the motor vehicle, in the same way that the number of attachment openings 18 is determined based on the drive device of the glazing.

As shown in FIGS. 1 to 3, the laminated glazing 10 comprises at least one outer glass sheet 20 and one inner glass sheet 30 which are assembled via an interlayer 40.

The outer glass sheet 20 comprises an outer face 22 and an inner face 24, oriented towards the outside space E and towards the inside space I, respectively.

As shown in FIG. 1, the outer glass sheet 20 comprises consecutively an upper edge 21, a rear edge 23, a lower edge 25 and a front edge 27, said opposing upper edge 21 and lower edge 25 extending generally according to the longitudinal orientation and said opposing rear edge 23 and front edge 27 extending generally according to the vertical orientation.

The lower edge 25 of the outer glass sheet 20 has, centrally between two excrescences forming said attachment parts 16, a curved section forming a concave profile oriented downwardly.

In each of said attachment parts 16, a hole 26 passes through the outer glass sheet 20. The hole 26 provided in said outer glass sheet 20 has an axis A1, referred to as first axis, and a diameter "D1".

Advantageously, the hole 26 of the outer glass sheet 20 is chamfered at one and/or the other of said faces, the outer face 22 and the inner face 24, respectively.

The inner glass sheet 30 comprises an outer face 32 and an inner face 34, oriented towards the outside space E and towards the inside space I, respectively.

As shown in FIG. 2, the inner glass sheet 30 comprises consecutively an upper edge 31, a rear edge 33, a lower edge 35 and a front edge 37, said opposing upper edge 31 and lower edge 35 extending generally according to the longitudinal orientation and said opposing rear edge 33 and front edge 37 extending generally according to the vertical orientation.

The laminated glazing 10 shown in FIGS. 1 to 3 is a symmetric glazing, i.e. a glazing wherein the inner glass sheet 30 completely covers the outer glass sheet 20, said glass sheets having identical dimensions.

The attachment parts 16 for attaching the glazing 10 are made up of the outer glass sheet 20, the interlayer 40 and the outer glass sheet 30 as shown in detail by the cross-section of FIG. 8 according to the plane VIII-VIII depicted in FIGS. 1 and 2.

Preferably, the outer glass sheet 20 and the inner glass sheet 30 herein have the same thickness, the outer glass sheet 20 having according to the transverse orientation a thickness which is equal to the thickness of the inner glass sheet 30.

Alternatively, the inner glass sheet 30 is thinner than the outer glass sheet 20, i.e. has a smaller thickness.

The lower edge 35 comprises a profile complementing that of the lower edge 25 of the outer glass sheet 20. Thus, the lower edge 35 of the inner glass sheet 30 has a centrally curved section forming a concave profile oriented downwardly.

In each of said attachment parts 16, a hole 36 passes through the inner glass sheet 30. The hole 36 provided in the inner glass sheet 30 has an axis A2, referred to as second axis, and a diameter "D2".

Advantageously, the hole 36 of the inner glass sheet 30 is chamfered at one and/or the other of said faces, the outer face 32 and the inner face 34, respectively.

The interlayer 40 comprises at least one sheet of polymer material, the interlayer 40 connecting together the outer glass sheet 20 and the inner glass sheet 30 of the glazing 10.

In this first embodiment, the interlayer 40 comprises a single sheet of polymer material.

Preferably, said sheet of polymer material forming the interlayer 40 is a sheet of polyvinyl butyral (PVB). The thickness of the interlayer 40 is for example comprised between 0.3 mm and 1.2 mm.

In an alternative not shown, the interlayer 40 is a multilayer structure, i.e. it consists of more than one sheet.

The interlayer 40 comprises for example two sheets of polymer material such as a first sheet and a second sheet respectively of polyvinyl butyral (PVB) one of which advantageously has sound-deadening properties. This bilayer structure forming the interlayer 40 is also referred to as "bilayer".

The interlayer 40 may comprise more than two sheets and for example consist of three sheets of polymer material, or a "trilayer", comprising for example a sheet of polyethylene terephthalate (PET) disposed between two sheets of polyvinyl butyral (PVB) one of which advantageously has sound-deadening properties or else a sheet of polyvinyl butyral (PVB), which advantageously has sound-deadening properties, is disposed between two other sheets of polyvinyl butyral (PVB).

As shown in FIG. 3, the interlayer 40 comprises an outer face 42 located opposite the inner face 24 of the outer glass sheet 20 and an inner face 44 located opposite the outer face 32 of the inner glass sheet 30.

The interlayer 40 comprises consecutively an upper edge 41, a rear edge 43, a lower edge 45 and a front edge 47, said opposing upper edge 41 and lower edge 45 extending generally according to the longitudinal orientation and said opposing rear edge 43 and front edge 47 extending generally according to the vertical orientation.

The interlayer 40 extends in the non-visible part 14, that is below the limit of visibility LV of the glazing 10.

The interlayer 40 comprises at least one opening preferably formed by a circular hole 46, the hole 46 being centered on a reference axis O of the attachment opening 18 or, within the mismatch, generally aligned with the hole 26 of the outer glass sheet 20 and the hole 36 of the inner glass sheet 30.

Preferably, the hole 46 here has a diameter that is equal to the diameters D1 and D2 of the holes 26 and 36.

The attachment opening 18 of the glazing 10 is formed by at least the hole 26 having the first axis A1 which is provided in the outer glass sheet 20, the hole 46 provided in the interlayer 40 and the hole 36 having the second axis A2 which is provided in the inner glass sheet 30.

According to one feature of the invention, the first axis A1 of the hole 26 of the outer glass sheet 20 and the second axis A2 of the hole 36 of the inner glass sheet 30 are mismatched with respect to one another according to a mismatch "d".

The mismatch "d" is configured to form a first blocking surface S1 on the inner face 24 of the outer glass sheet 20 and a second blocking surface S2 on the inner face 34 of the inner glass sheet 30.

Preferably, the axis A1 of the hole 26 and the axis A2 of the hole 36 are vertically mismatched with respect to one another, i.e. according to the vertical orientation of the 3D coordinate system (L, V, T).

The mismatch "d" thus corresponds to a vertical offset between the axis A1 and the axis A2 which gives the attachment opening 18 a non-circular shape, for example an oblong shape according to the value of said mismatch.

Preferably, the diameter D1 of the hole 26 in the outer glass sheet 20 is equal to the diameter D2 of the hole 36 in the inner glass sheet.

The non-circular shape of the attachment opening 18 corresponds to superimposing the hole 26 and the hole 36 which, while respectively circular, are not coaxial due to the mismatch "d" between the axes A1 and A2.

The glazing 10 comprises at least one connecting member 50 of which the first embodiment more particularly shown by FIGS. 4 to 7 is described below in connection with the laminated glazing 10.

The first blocking surface S1 on the inner face 24 of the outer glass sheet 20 is more particularly visible in the enlarged view of FIG. 2 centered on the front attachment part 16. As shown in this enlarged view, the first blocking surface S1 is crescent-shaped.

The second blocking surface S2 on the inner face 34 of the inner glass sheet 30 is more particularly visible in the enlarged view of FIG. 1 centered on the front attachment part 16. As shown in this enlarged view, the second blocking surface S2 is crescent-shaped.

The first blocking surface S1 and the second blocking surface S2 are arranged diametrically opposite one another, said first and second blocking surfaces S1, S2 being arranged symmetrically, here vertically, with respect to the reference axis O of the attachment opening 18 of the glazing 10.

Preferably, said first and second blocking surfaces S1, S2 are indeed arranged symmetrically according to the vertical orientation. Alternatively, said first and second blocking surfaces S1, S2 are arranged symmetrically according to another orientation, for example according to the longitudinal orientation.

The reference axis O corresponds to an average axis with respect to the axis A1 of the hole 26 and the axis A2 of the hole 36 which are preferably mismatched vertically, said reference axis O with transverse orientation forming an axis of symmetry for the attachment opening 18.

The first blocking surface S1 carried by the outer glass sheet 20 is oriented transversely towards the inside while the second blocking surface S2 carried by the inner glass sheet 30 is oriented transversely towards the outside of the glazing 10.

The first blocking surface S1 is formed by a portion of the inner face 24 of the outer glass sheet 20 and said second blocking surface S2 being formed by a portion of the outer face 32 of the inner glass sheet 30.

By comparison, the opening 18 of the attachment part 16 located at the rear which is shown in FIGS. 1 and 2 comprises a connecting member 50 configured to engage with means 70 for attaching said glazing 10 with a drive device (not depicted).

As can be seen, a connecting member 50 is thus normally mounted in each of the attachment openings 18 that the front and rear attachment parts 16 of the glazing 10 comprise.

As shown by FIGS. 4 to 7, the connecting member 50 comprises a first surface 51 configured to engage with said first blocking surface S1 of the outer glass sheet 20 and a second surface 53 configured to engage with said second blocking surface S2 of the inner glass sheet 30.

The first surface 51 and the second surface 53 of the connecting member 50 are respectively crescent-shaped, i.e. they have a shape that complements the shape of said first and second blocking surfaces S1 and S2 resulting from the vertical mismatch "d" between the axes A1 and A2.

FIG. 8 shows more particularly the engagement between the first surface 51 of the connecting member 50 and said first blocking surface S1, on the one hand, and the engagement between the second surface 53 of the connecting member 50 and said second blocking surface S2, on the other hand.

Preferably, the connecting member 50 is attached to the glazing 10 by interlocking and/or by bonding.

Advantageously, the connecting member 50 is configured to pass through said attachment opening 18 from side to side so as to form a spacer with respect to the laminated glazing 10.

Preferably, the connecting member 50 does not protrude out of the attachment opening 18, particularly leaving the outer face 22 of the outer glass sheet 20 free like the inner face 34 of the inner glass sheet 30.

Advantageously, the connecting member 50 is configured to be housed inside said attachment opening 18, in the thickness E of the laminated glazing 10 as shown in FIG. 8.

The connecting member 50 comprises an outer face 52 and an inner face 54. Preferably, the connecting member 50 comprises an outer face 52 and an inner face 54 which here are planar.

As shown by FIG. 8, the connecting member 50 is configured so that the outer face 52 is flush with respect to the outer face 22 of the outer glass sheet 20 and the inner face 54 is flush with respect to the inner face 34 of the inner glass sheet 30.

In other words, said faces 52, 54 are each overall coplanar, at the attachment part, with the outer face 22 of the outer glass sheet 20 forming the outer surface of the laminated glazing 10 and with the inner face 34 of the inner glass sheet 30 forming the inner surface of the laminated glazing 10, respectively.

Advantageously, the connecting member 50 is configured to form a spacer in order particularly to limit when the laminated glazing 10 is assembled the creep of the polymer material of said at least one sheet of the interlayer 40.

The first surface 51 and the second surface 53 of the connecting member 50 are arranged diametrically opposite one another, said surfaces 51, 53 being symmetrical with respect to a main axis A of the connecting member 50.

Advantageously, said connecting member 50 is provided with a hole 56 centered on said axis A, said hole 56 being intended to receive the means 70 for attaching said laminated glazing 10 in order to connect it movably with a drive device.

By way of non-limiting example, the hole 56 of the connecting member 50 has a diameter comprised between 3 mm and 12 mm.

Preferably, the hole 56 here is smooth on the inside.

Preferably, the connecting member 50 comprises at least one chamfer 55 made at the edge delimiting the hole 56 on one and/or the other of said outer face 52 and inner face 54.

The main axis A of the connecting member 50 is intended to be coaxial, i.e. to coincide, with the reference axis O of the attachment opening 18 of the laminated glazing 10, once it has been mounted.

In this first embodiment, the connecting member 50 is advantageously produced as a single, integral piece, particularly by injection of a thermoplastic material.

Preferably, the connecting member 50 is made of a thermoplastic material, for example particularly polyamide (PA), for example PA 6-6, polyoxymethylene (POM), polybutylene terephthalate (PBT).

Alternatively, the connecting member 50 is produced as at least two pieces, advantageously configured to be attached together by any appropriate means, particularly by interlocking.

As shown in FIGS. 4 to 7, the connecting member 50 has an elliptical perimeter with the axis A1 of the hole 26 and the axis A2 of the hole 36 located on the major axis separated by a distance corresponding to the mismatch "d".

Figure 5:
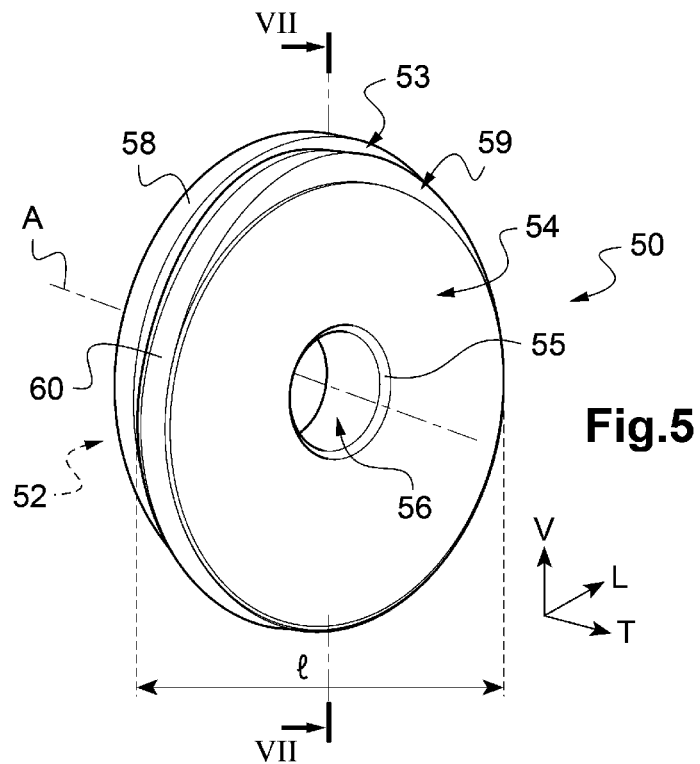
FIG. 5 is a perspective view which depicts, viewed from the inside, the connecting member according to the first embodiment and which shows the second bearing surface intended to engage, directly or by positioning therebetween said at least one sheet of polymer material of the interlayer, with the second blocking surface carried by the outer face of the inner glass sheet.

As shown in FIG. 5, the distance "I" at the minor axis of the elliptical connecting member 50 corresponds substantially to the diameter "D1" of the hole 26 or to the diameter "D2" of the hole 36.

Advantageously, the shape of the connecting member 50 is determined as a function of the configuration of the attachment opening 18, in particular as a function of said first and second blocking surfaces S1 and S2.

Preferably, the connecting member 50 comprises a first chamfer 57 which, associated with the first surface 51, is made in a section of an outer edge 58 of the member 50 and a second chamfer 59 which, associated with the second surface 53, is made in a section of an inner edge 60 of the member 50.

As shown in FIGS. 4 to 7, the outer edge 58 and the inner edge 60 each belong to an outer part and an inner part of the member 50 each being generally "washer"-shaped, vertically mismatched with respect to one another but sharing the hole 56 passing through said member 50 following the axis A.

Advantageously, the first chamfer 57 and the second chamfer 59 are intended to facilitate the mounting of said connecting member 50 in the attachment opening 18.

Preferably, the mounting of the connecting member 50 is carried out in the manner described below.

Advantageously, the connecting member 50 is mounted in the attachment opening 18 prior to the assembly of the outer glass sheet 20 and the inner glass sheet 30 by the interlayer 40, by virtue of which no operation is required following the assembly of the laminated glazing 10.

Advantageously, the attachment of said connecting member 50 is obtained at least by interlocking prior to the assembly of said glass sheets 20 and 30 and the interlayer 40 constituting said laminated glazing 10.

The connecting member 50 is firstly disposed in a so-called insertion position in which the member 50 is placed horizontally with respect to the attachment opening 18 so that the axis A of the connecting member 50 extends according to the vertical orientation (and not the transverse orientation).

The connecting member 50 is then inserted transversely at the center of the attachment opening 18, indistinctly from the outside through the hole 26 or from the inside through the hole 36 which have the same diameter (D1=D2) corresponding to the distance "I" of the connecting member 50.

Once inserted, the connecting member 50 is then switched to its so-called operational position, pivoting about an axis of rotation with longitudinal orientation, until the surfaces 51, 53 of the member 50 are respectively bearing against the blocking surfaces SS, S2.

Advantageously, the connecting member 50 is thus attached to the glazing 10 by interlocking between said surfaces 51, 53 of the member 50 and the blocking surfaces S1, S2.

The connecting member 50 is then blocked in its operational position, mounted inside the attachment opening 18 formed by said holes 26 and 36. In this operational position, the connecting member 50 can obviously be unblocked by rotating it in the opposite direction to the rotation performed during the mounting thereof.

Preferably, the connecting member 50 is also attached to the glazing 10 by bonding, in particular via the polymer material of said at least one sheet of the interlayer 40.

Advantageously, said at least one sheet of polymer material forming the interlayer 40 is configured to cover all or at least part of said blocking surfaces 51, S2 so that a layer of polymer material constituting said sheet (for example polyvinyl butyral PVB) is positioned between the surfaces 51, 53 of the connecting member 50 and said blocking surfaces S1, S2.

In one alternative not depicted, said at least one sheet of polymer material forming the interlayer 40 is configured so as not to cover said blocking surfaces S1, S2, the hole 46 provided in the interlayer 40 having for example a diameter larger than the diameter of the hole 26 of the outer glass sheet 20 and of the hole 36 of the inner glass sheet 30.

Once the connecting member 50 is mounted in the opening 18, the laminated glazing 10 is assembled conventionally in order to connect the outer glass sheet 20 and the inner glass sheet 30 together via the interlayer 40.

Advantageously, the connecting member 50 is mounted prior to the complete assembly of the laminated glazing 10, permanently once said assembly has been carried out.

The attachment means 70 are then able to be put in place so as to connect the laminated glazing 10 to a drive device.

The attachment means 70 comprise for example at least two perforated plates (not depicted) and a pin 72 passing through them as well as the connecting member 50 at the hole 56. As shown in FIG. 3, the pin 72 comprises a head 74 able to apply a clamping force on one of the plates and, at one free end 76 opposite the head 74, comprises a thread able to engage with a threaded hole provided in the other one of the plates, alternatively with a nut.

The plates of the attachment means 70 are arranged on either side of the connecting member 50 rigidly connected to the glazing and are then clamped by screwing respectively against the outer 52 and inner 54 faces of the member 50 so that said connecting member 50 provides as indicated previously a spacer function.

Advantageously, the connecting member 50 prevents the clamping forces exerted by the attachment means 70 from being applied directly to the glass sheets 20, 30 of the laminated glazing 10, by virtue of which the risks of creep of the polymer material are avoided at the attachment part 16 of the glazing 10 biased by said attachment means 70, preferably in this case by screwing or another equivalent attachment means.

The following is a description, by comparison with the first embodiment, of a second embodiment of a laminated glazing 10 comprising a connecting member 50.

Figure 10:
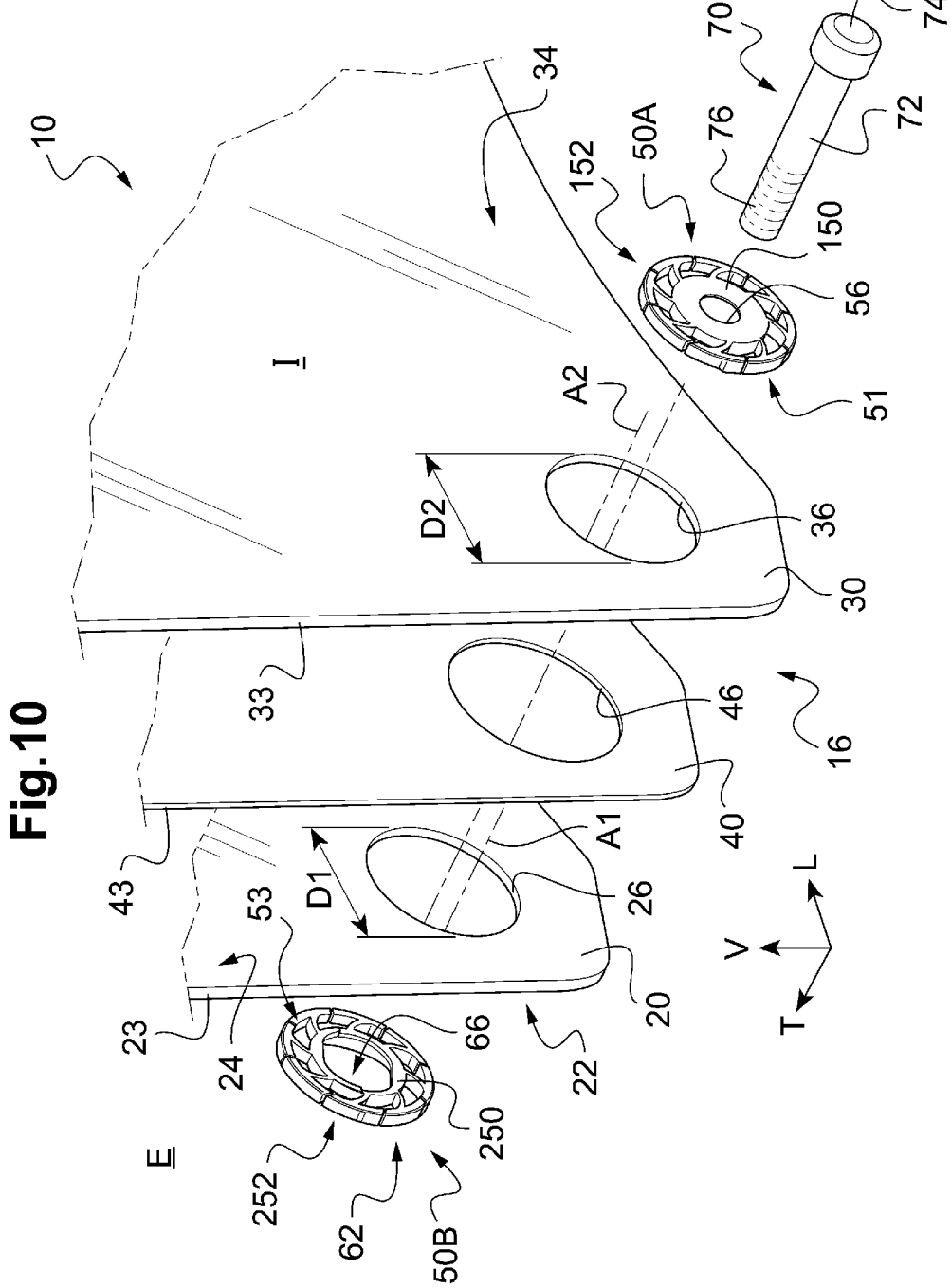
FIG. 10 is an exploded view which depicts in detail the rear attachment part of the laminated glazing according to FIG. 9 and which shows the holes in the outer and inner glass sheets whose axes are mismatched by a determined mismatch in order to create the blocking surfaces as well as the complementary connecting member produced as two pieces configured to be attached to one another.

As shown in an exploded view in FIG. 10, the laminated glazing 10 is identical to that described previously for the first embodiment, in reference to FIGS. 1 to 3.

According to one feature of the invention, the first axis A1 of the hole 26 of the outer glass sheet 20 and the second axis A2 of the hole 36 of the inner glass sheet 30 are mismatched with respect to one another according to a mismatch "d" which is configured to form the first blocking surface S1 on the inner face 24 of the outer glass sheet 20 and the second blocking surface S2 on the inner face 34 of the inner glass sheet 30.

Figure 17:
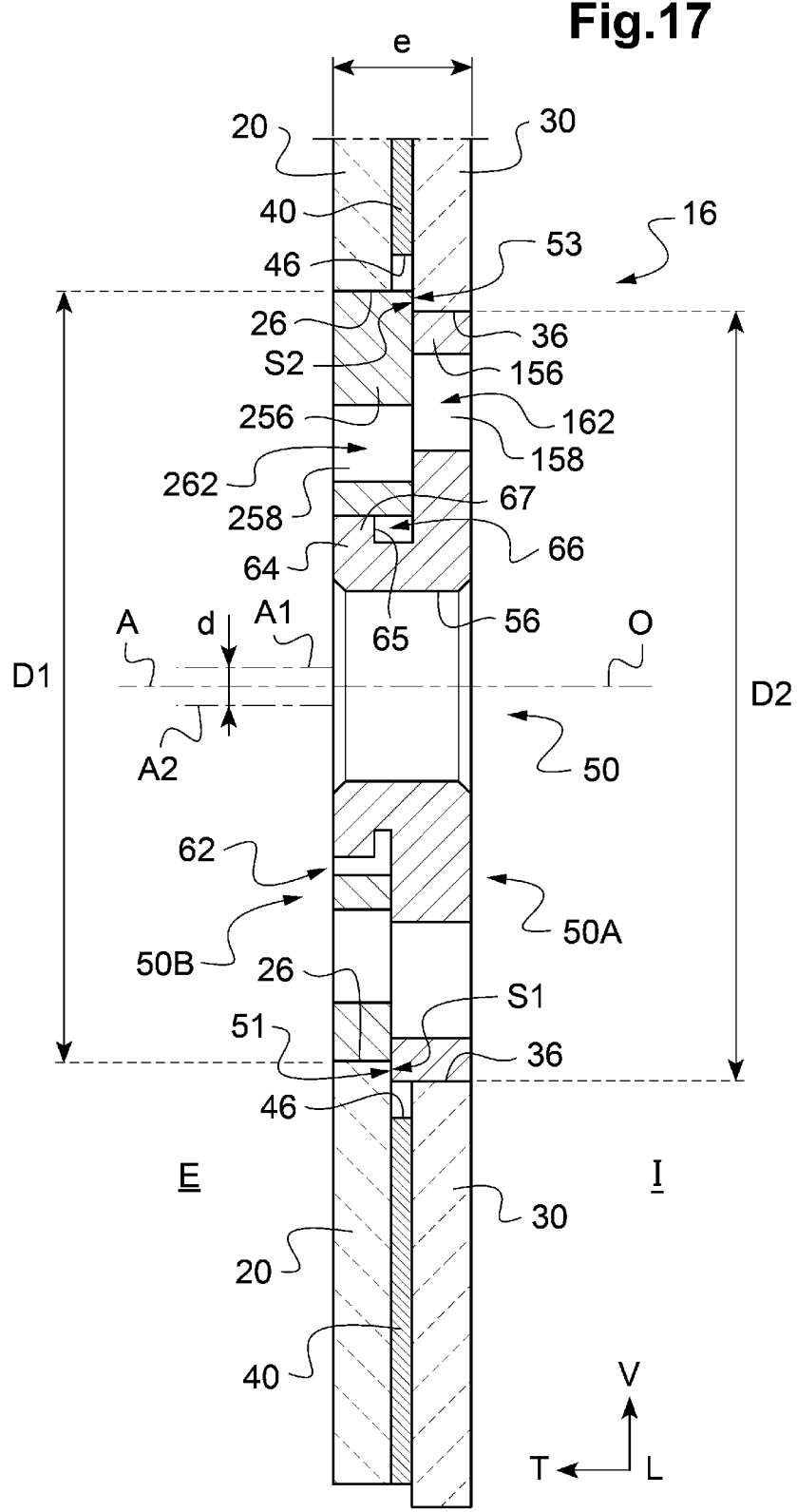
FIG. 17 is a cross-sectional view according to the plane XVII-XVII depicted in FIGS. 15 and 16 which depicts the two pieces of the connecting member attached together and which shows the member whose first face is bearing against the first blocking surface and the second face of the member is bearing against the second blocking surface, respectively positioning therebetween the sheet of polymer material of the interlayer.

The first blocking surface S1 and the second blocking surface S2 are particularly visible in cross-section in FIG. 17.

The mismatch "d" is preferably a vertical mismatch as in the first embodiment and the diameter D1 of the hole 26 is equal to the diameter D2 of the hole 36 so that said blocking surfaces S1 and S2 are crescent-shaped (as shown previously in FIGS. 1 and 2).

The first blocking surface S1 and the second blocking surface S2 are arranged diametrically opposite one another according to the vertical orientation.

The first and second blocking surfaces S1, S2 are arranged symmetrically with respect to a reference axis O of the attachment opening 18 of the glazing 10, at the bottom for the first surface S1 and at the top for the second blocking surface S2, respectively.

The diameter of the hole 46 provided in the sheet of polymer material forming the interlayer 40 has a value which here is greater than that of the holes 26 and 36, and is such that said blocking surfaces S1 and S2 are not covered by polymer material.

The first surface 51 and the second surface 53 carried by the connecting member 50 thus engage directly with said blocking surfaces S1 and S2.

Alternatively (like in the first embodiment), the hole 46 in the interlayer 40 is configured so that said blocking surfaces S1 and S2 are covered at least by one layer of polymer material, such as polyvinyl butyral PVB, henceforth positioned between the blocking surfaces S1 and S2 and said surfaces 51, 53 of the connecting member 50.

In this second embodiment, the connecting member 50 is advantageously produced as two pieces, a so-called inner piece 50A, and another so-called outer piece 50B, respectively. Alternatively, the connecting member 50 can be produced as a single piece.

The complementary pieces 50A and 50B are able to be rigidly connected to one another via fastening means 62 which, complementing one another, are carried by each of said pieces.

Preferably, said pieces 50A and 50B forming the connecting member 50 are attached together by interlocking, preferably by being screwed together.

Advantageously, the means 62 for fastening the pieces 50A and 50B of the connecting member 50 are configured to perform "quarter-turn" screwing.

Alternatively, said pieces 50A and 50B forming the connecting member 50 are attached together by any other appropriate means, particularly by elastic interlocking (or snap-fitting), by interference fitting or even by bonding.

The inner piece 50A of the member 50 comprises a central part 150 and a peripheral part 152 surrounding said central part 150, said piece 50A being shown more particularly in FIGS. 11 and 12.

As shown in FIG. 11, the central part 150 comprises the hole 56 through which the attachment means 70 for attaching the laminated glazing 10 with a drive device are intended to pass. The hole 56 is centered on a main axis A of the connecting member 50.

Figure 15:
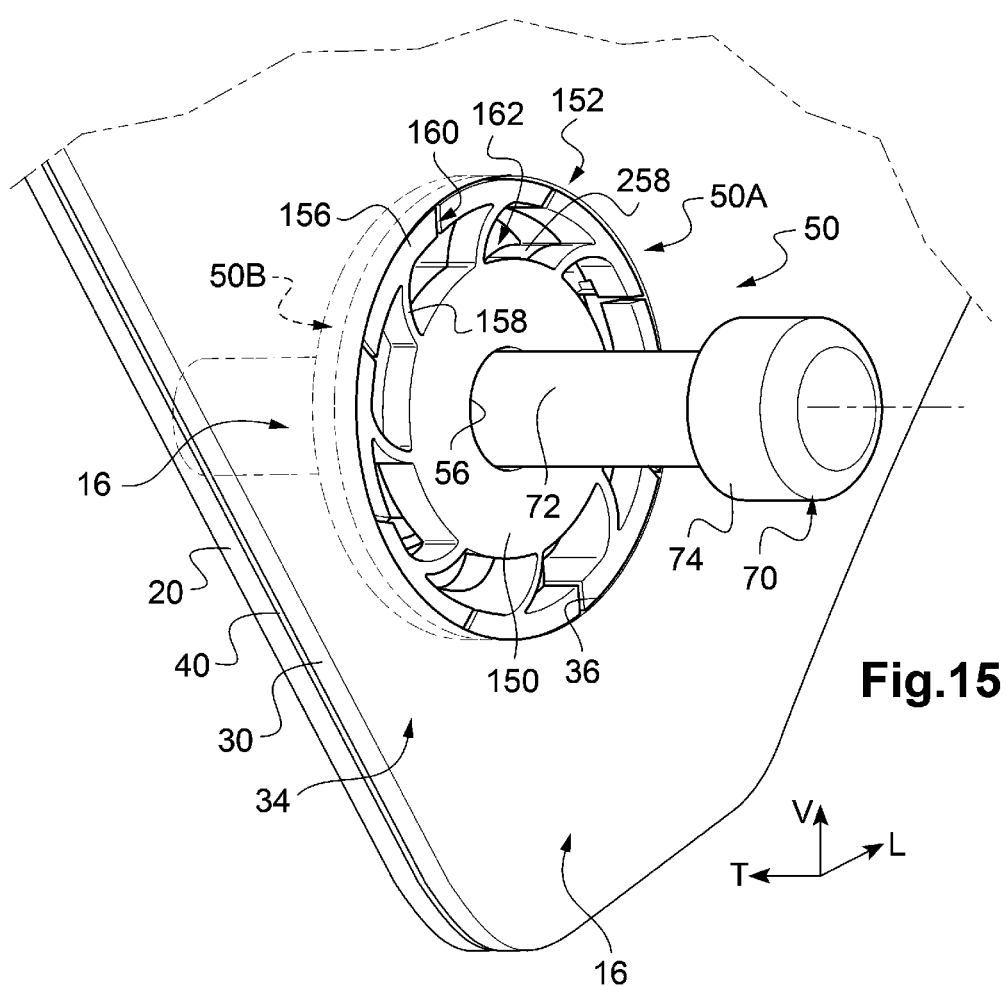
FIG. 15 is a perspective view which depicts, viewed from the inside, the rear attachment part of the glazing after mounting the connecting member and which shows the first piece of the member that is flush with respect to the inner face of the inner glass sheet and through which a pin that the attachment means comprise passes.
Figure 16:
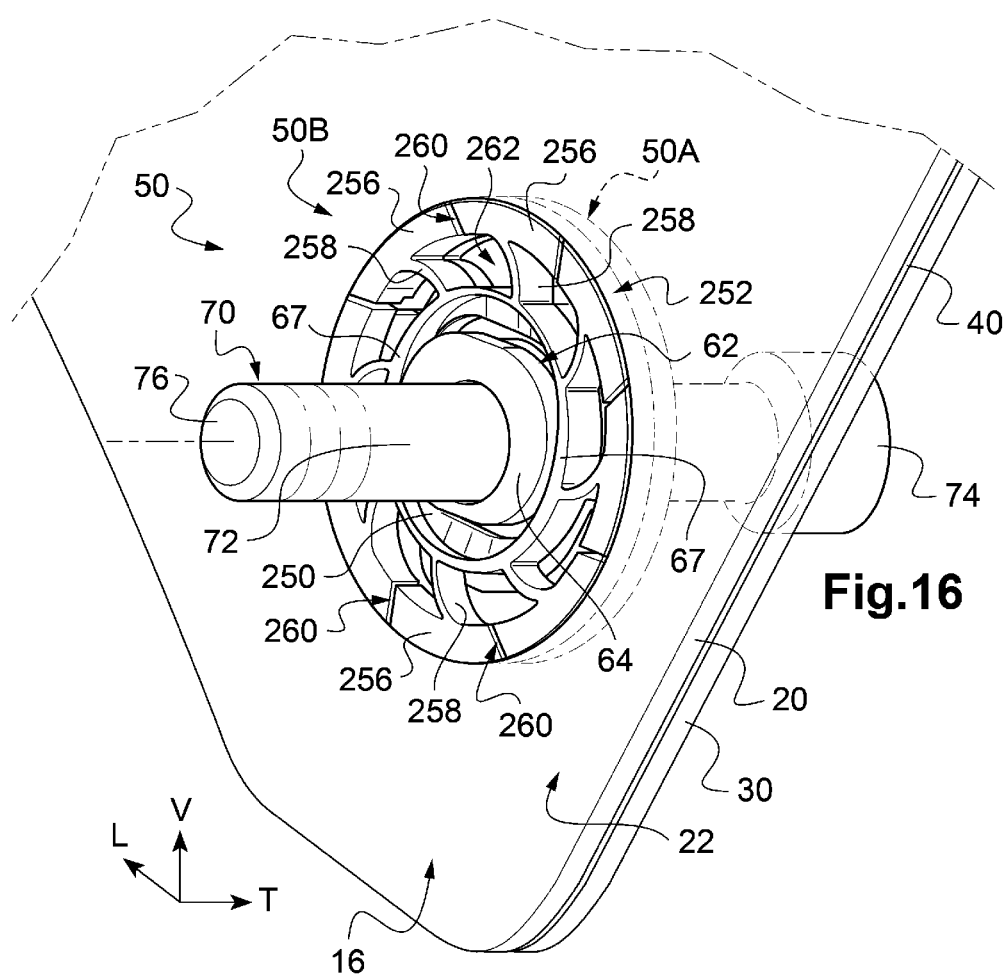
FIG. 16 is a perspective view which depicts, viewed from the outside, the rear attachment part of the glazing after mounting the connecting member and which shows the second piece of the member which, rigidly connected to the first piece, is flush with respect to the outer face of the outer glass sheet and through which the free end of said pin passes.

Preferably, the attachment means 70 shown in FIGS. 10, 15 and 16 are identical to those described previously.

The central part 150 comprises the inner face 54, here with an annular shape and surrounding the hole 56.

As shown in FIG. 12, the central part 150 of the piece 50A comprises part of the fastening means 62 formed by at least one male element 64 that protrudes towards the outside relative to the rest of the piece 50A.

The fastening means 62 are advantageously configured to make it possible to rigidly connect said pieces 50A and 50B by quarter-turn screwing.

To this end, the male element 64 comprises one or more technical shapes 65 intended to engage with complementary technical shapes 67 carried by the other outer piece 50B.

Figure 13:
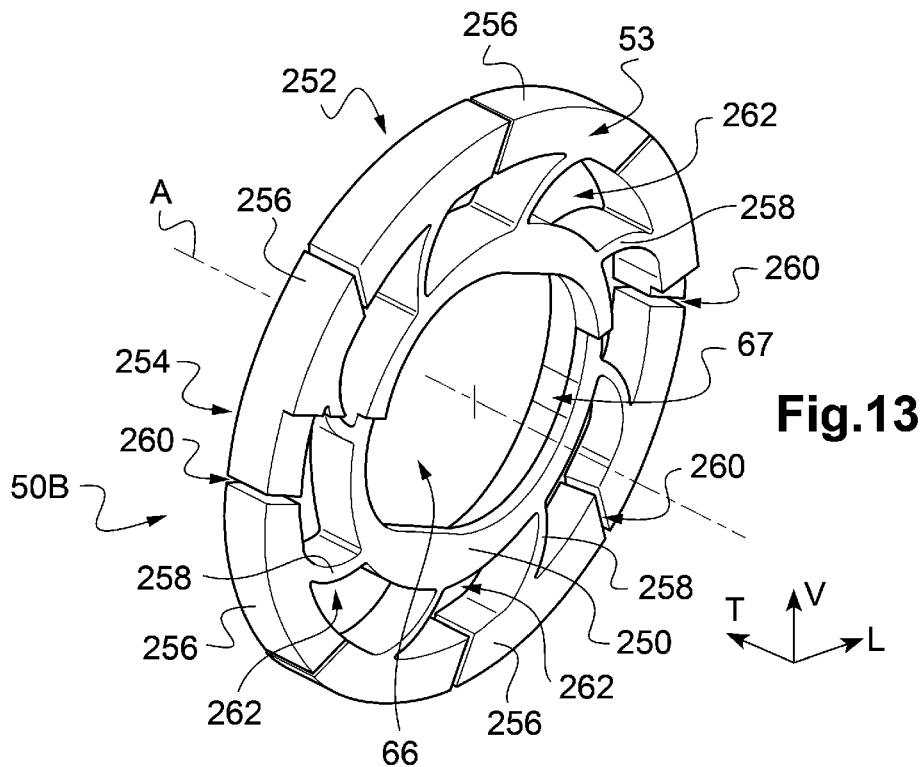
FIG. 13 is a perspective view which depicts, viewed from the inside, the second piece of the connecting member according to the second embodiment and which shows the peripheral part of said second piece configured to be radially deformable and surrounding a central part provided with an opening through which the means for fastening by interlocking rigidly connected to the first piece are intended to pass.
Figure 14:
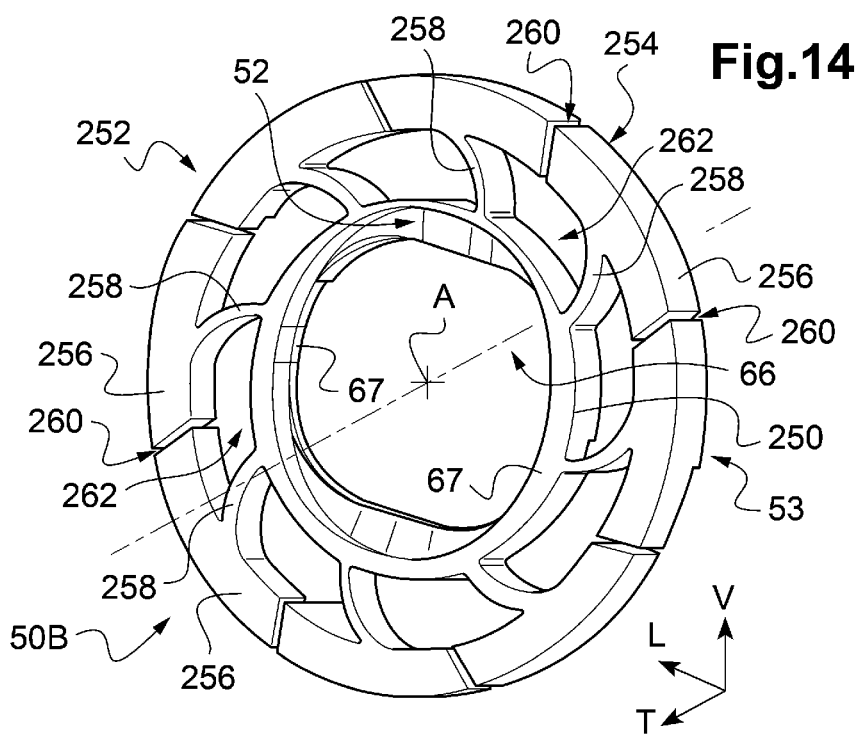
FIG. 14 is a perspective view which depicts, viewed from the outside, the second piece of the connecting member according to FIG. 13 and which shows the central part surrounding the opening which comprises technical shapes intended to engage with complementary shapes carried by the first piece of the member in order to form the fastening means that serve to connect the two pieces of the member.

The outer piece 50B is more particularly shown in FIGS. 13 and 14, said piece 50B comprising a central part 250 and a peripheral part 252 surrounding said part 250.

The central part 250 of the outer piece 50B comprises the other part of said fastening means 62 which comprises a female element 66 formed by an opening.

The opening 66 is configured for the male element 64 to pass through it, the pieces 50A and 50B being rigidly connected, assembled with one another in any manner possible.

The inner piece 50A is inserted transversely through the hole 36 provided in the inner glass sheet 30 and the outer piece 50B through the hole 26 provided in the outer glass sheet 20 and then the pieces 50A and 50B are moved together to insert the male element 64 through the opening 66.

The piece 50A is then rotated, for example clockwise, performing a stroke that corresponds to a quarter turn in order to trigger the interlocking of the means 62 for fastening by screwing, i.e. the engagement between the technical shapes 65 carried by the element 64 of the piece 50A and the technical shapes 67 carried by the piece 50B.

As shown in FIG. 14, the complementary technical shapes 67 are arranged on an outer face 52 of the central part 250 of the outer piece 50B, around the opening 66 for the passage of the element 64.

Preferably, said technical shapes 65 and 67 are configured so as to abut with one another when the quarter-turn stroke has been performed.

As indicated previously, the means 62 for fastening by quarter-turn screwing are merely a non-limiting exemplary embodiment.

According to another feature of this second embodiment, the connecting member 50 is configured to be able to deform elastically, particularly in a radial direction that is orthogonal to the main axis A of the member 50.

As shown in FIGS. 11 to 14, the inner piece 50A and the outer piece 50B forming the connecting member 50 respectively comprise a peripheral part 152 and a peripheral part 252 having, in the free state before mounting, a circular perimeter.

And yet, as described for the first embodiment, the attachment opening 18 has a non-circular, elliptical shape, due to the mismatch "d" between the axes A1 and A2 so that the connecting member 50 is configured to be able to be adjusted when each of the pieces 50A and 50B is inserted into the attachment opening 18.

Advantageously, the elastic deformation of the connecting member 50 is obtained by virtue of the design of each of said peripheral part 152 and peripheral part 252 which are flexible in the radial direction.

The fact that the connecting member 50 is thus elastically deformable in the radial direction is independent of whether it is produced as one or two pieces 50A, 50B.

The peripheral part 152 of the inner piece 50A comprises a discontinuous ring 154 formed by pads 156 which are each connected to the central part 150 by at least one elastic arm 158 that is able to deform radially.

The pads 156 forming the flexible ring 154 are curved, forming an arc, each pad 156 being separated from the adjacent pads 156 by a space 160 provided on either side in order to allow it to deform elastically independently of the other pads 156.

Preferably, each pad 156 is connected to the central part 150 by an arm 158 having a curved profile and reduced thickness in order to grant flexibility to the peripheral part 152.

The peripheral part 152 is perforated, having recesses 162 extending circumferentially between two consecutive arms 158 and radially between the central part 150 and the ring 154 formed by the pads 156.

Preferably, the pads 156 and the associated arms 158 are distributed circumferentially in a regular manner about the axis A, as are the recesses 162.

As shown in FIGS. 13 and 14, the outer piece 50B of the connecting member 50 comprises a flexible peripheral part 252 having a structure identical to that of the inner piece 50A which was described in reference to FIGS. 11 and 12 so that the structure is not described again in detail hereunder.

The peripheral part 252 of the outer piece 50B comprises a ring 254 comprising pads 256, each of which is connected to the central part 250 by an arm 258, two adjacent pads 256 being separated by a space 260.

The peripheral part 252 of the outer piece 50B is also perforated by recesses 262 which are circumferentially distributed in a regular manner around the axis A.

As shown in FIG. 12, the first surface 51 of the connecting member 50 intended to engage with said first blocking surface S1 is carried by the flexible ring 154 of the inner piece 50A.

Indeed, the first surface 51 is carried by a part of the flexible ring 154 which has transversely, over a given angular sector, a greater thickness so as to protrude in the direction of the first blocking surface S1.

Advantageously, the thickness of the part of the flexible ring 154 carrying the first surface 51 is determined as a function of the thickness of the interlayer 40 so that said first surface 51 bears directly against all or part of the first blocking surface S1 carried by the inner face 24 of the outer glass sheet 20.

As shown in FIG. 13, the second surface 53 of the connecting member 50 intended to engage with said second blocking surface S2 is carried by the flexible ring 254 of the outer piece 50B.

As for the first surface 51, the flexible ring 254 carrying the second surface 53 has transversely, over a given angular sector, a greater thickness so as to protrude in the direction of the second blocking surface S2.

Advantageously, said second surface 53 is thus bearing directly against all or part of the second blocking surface S2 carried by the outer face 32 of the inner glass sheet 30.

By comparison with the first embodiment, the first surface 51 and the second surface 53 are not crescent-shaped but rather form a horizontal curved line, the width of the surface 51, 53 being constant from one end to the other of the part of the ring 154, 254 that carries it.

FIGS. 15 and 16 depict, viewed from the inside and then from the outside, respectively, the connecting member 50 after assembling the two pieces 50A and 50B.

As can be seen in these FIGS. 15 and 16, the means 62 for fastening by screwing are configured so as to angularly position the inner piece 50A and the outer piece 50B coinciding with one another.

Advantageously, the recesses 162 of the inner piece 50A are aligned transversely with the recesses 262 of the outer piece 50B, so that the flexible arms 158 are aligned with the flexible arms 258.

The mounting of the connecting member 50 in the attachment opening 18 is carried out simultaneously with the fastening of the inner piece 50A with the outer piece 50B which are thus each inserted transversely into one of the holes 36 and 26.

Advantageously, the connecting member 50 is attached to the glazing 10 by interlocking, on the one hand, radially between the flexible peripheral parts 152, 252 and the opening 18 and, on the other hand, between said surfaces 51, 53 of the member 50 and the blocking surfaces S1, S2 created by the mismatch "d" between the axes A1 and A2 of the holes 26 and 36.

Advantageously, the connecting member 50 formed by the two pieces 50A and 50B is inserted into the attachment opening 18 prior to the assembly of the laminated glazing 10.

Advantageously, the connecting member 50 is also configured herein to form a spacer that is particularly capable of limiting the creep of the polymer material.

Preferably and as shown in FIGS. 15 and 16, the pieces 50A and 50B are in operational position (after mounting) flush with respect to the outer face 22 and the inner face 34 of the laminated glazing 10.

Advantageously, the connecting member 50 according to the first embodiment and the second embodiment is comprised in the thickness E of the laminated glazing 10 by virtue of which a compact attachment can be obtained.

By comparison with an insert according to a certain embodiment of the background art, the connecting member 50 does not protrude out of the opening 18 and leaves free the outer face 22 and the inner face 34 of the laminated glazing 10.

The invention claimed is:

1. A laminated glazing for a motor vehicle, comprising:
   an outer glass sheet and an inner glass sheet assembled by an interlayer which comprises at least one sheet of polymer material,
   at least one attachment part for attaching the laminated glazing through which at least one attachment opening passes which is formed by at least a hole having a first axis which is provided in the outer glass sheet, a hole provided in the interlayer and a hole having a second axis which is provided in the inner glass sheet, wherein the first axis of the hole in the outer glass sheet is offset from the second axis of the hole in the inner glass sheet, creating a misalignment configured to form a first blocking surface on an inner face of the outer glass sheet and a second blocking surface on an outer face of the inner glass sheet, said misalignment resulting in a non-circular attachment opening, wherein said first and second blocking surfaces are configured to receive and retain at least one connecting member by engaging with complementary surfaces on the connecting member, wherein the at least one connecting member is attached to the laminated glazing by passing through said attachment opening, said connecting member provided with a hole being intended to receive an attachment device adapted to attach said laminated glazing with a drive device, wherein said at least one connecting member is preformed prior to being inserted into the opening, and is reversibly attached with a first surface shaped and configured to engage and interlock with said first blocking surface of the outer glass sheet and a second surface shaped and configured to engage and interlock with said second blocking surface of the inner glass sheet.

2. The laminated glazing according to claim 1, wherein the first blocking surface and the second blocking surface are respectively crescent-shaped.

3. The laminated glazing according to claim 1, wherein the first axis of the hole in the outer glass sheet and the second axis of the hole in the inner glass sheet are mismatched vertically with respect to one another.

4. The laminated glazing according to claim 1, wherein the first blocking surface and the second blocking surface are arranged diametrically opposite one another, said first and second blocking surfaces being arranged symmetrically with respect to an axis of the attachment opening of the laminated glazing.

5. The laminated glazing according to claim 1, wherein the connecting member is attached to the laminated glazing by interlocking between said surfaces of the connecting member and the blocking surfaces.

6. The laminated glazing according to claim 1, wherein the connecting member is attached to the laminated glazing by bonding via the polymer material of said at least one sheet of the interlayer.

7. The laminated glazing according to claim 1, wherein the first surface and the second surface of the connecting member are arranged diametrically opposite one another, said first and second surfaces being symmetrical with respect to an axis of the connecting member.

8. The laminated glazing according to claim 1, wherein the connecting member is made of a thermoplastic material.

9. The laminated glazing according to claim 1, wherein the connecting member is configured to form a spacer with respect to the laminated glazing to limit when the glazing is assembled creep of the polymer material of said at least one sheet of the interlayer.

10. The laminated glazing according to claim 1, wherein the connecting member of the attachment device is produced as a single, integral piece.

11. The laminated glazing according to claim 1, wherein the connecting member has an elliptic perimeter.

12. The laminated glazing according to claim 1, wherein the connecting member comprises a first chamfer associated with the first surface and a second chamfer associated with the second surface which are adapted to facilitate the mounting of said connecting member in the attachment opening.

13. The laminated glazing according to claim 1, wherein the connecting member is produced as two pieces able to be rigidly connected to one another via complementary fastening means carried by each of said pieces.

14. The laminated glazing according to claim 13, wherein said two pieces forming the connecting member are attached together by interlocking, alternatively by elastic interlocking or snap-fitting or by interference fitting or by bonding.

15. The laminated glazing according to claim 13, wherein the connecting member is configured to deform radially in an elastic manner in order to be able to be adjusted when said connecting member is inserted into the attachment opening.

16. The laminated glazing according to claim 1, wherein the laminated glazing is a side glazing that is slidably mounted in a door of the motor vehicle.

17. The laminated glazing according to claim 8, wherein the thermoplastic material is polyamide (PA), polyoxymethylene (POM), or polybutylene terephthalate (PBT).

18. The laminated glazing according to claim 17, wherein the polyamide (PA) is PA 6-6.

19. The laminated glazing according to claim 14, wherein said two pieces forming the connecting member are attached together by screwing.

20. The laminated glazing according to claim 1, wherein the at least one connecting member is reversibly attached by rotation.

* * * * *